United States Patent [19]
Caille et al.

[11] Patent Number: 5,124,712
[45] Date of Patent: Jun. 23, 1992

[54] METHOD OF FORMING THE RADIATION PATTERN OF A HIGH EFFICIENCY ACTIVE ANTENNA FOR AN ELECTRONICALLY-SCANNED RADAR, AND AN ANTENNA IMPLEMENTING THE METHOD

[75] Inventors: Gérard Caille, Tournefeuille; Cyril Mangenot, Toulouse, both of France

[73] Assignee: Alcatel Espace, Courbevoie, France

[21] Appl. No.: 665,202

[22] Filed: Mar. 6, 1991

[30] Foreign Application Priority Data

Mar. 9, 1990 [FR] France .................. 90 03028

[51] Int. Cl.⁵ .................................................. H01Q 3/36
[52] U.S. Cl. ........................................ 342/368; 342/372
[58] Field of Search .............. 342/368, 371, 372, 373, 342/374, 379

[56] References Cited

U.S. PATENT DOCUMENTS 4,052,723 10/1977 Miller .......................... 343/100 LE
4,766,437 8/1988 Schmidt et al. .................. 342/368
4,791,421 12/1988 Morse et al. ..................... 342/368
5,017,928 5/1991 Haupt et al. ..................... 342/379

FOREIGN PATENT DOCUMENTS 0194244 9/1986 European Pat. Off. .
0246640 11/1987 European Pat. Off. .

Primary Examiner—Mark Hellner
Attorney, Agent, or Firm—Sughrue, Mion, Zinn, Macpeak & Seas

[57] ABSTRACT

A method of forming the radiation pattern of a high efficiency active antenna for electronically-scanned radar, wherein its illumination laws, and thus its radiation patterns are dissociated in transmission and in reception; and equal amplitude illumination is provided in transmission in order to maximize the efficiency of the transmit amplifiers which are all identical, thereby minimizing their DC energy consumption and their dissipation. The invention is particularly suitable for use in space radars.

9 Claims, 25 Drawing Sheets

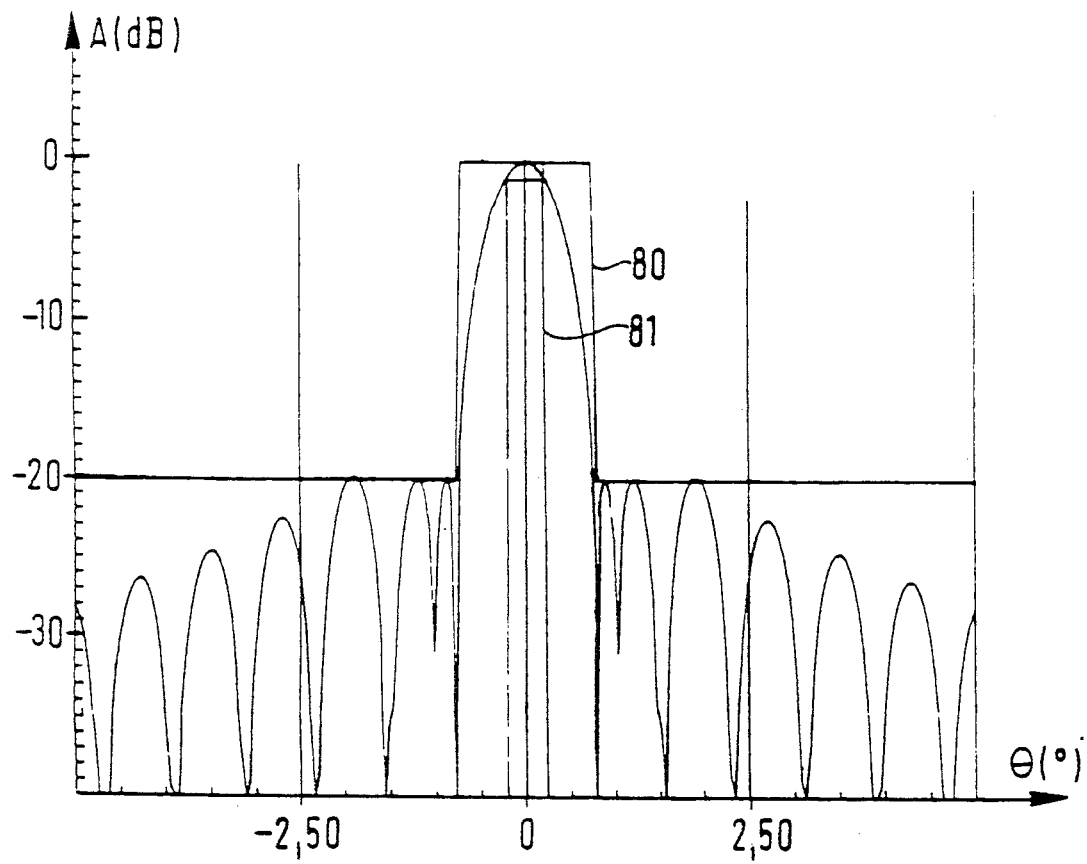

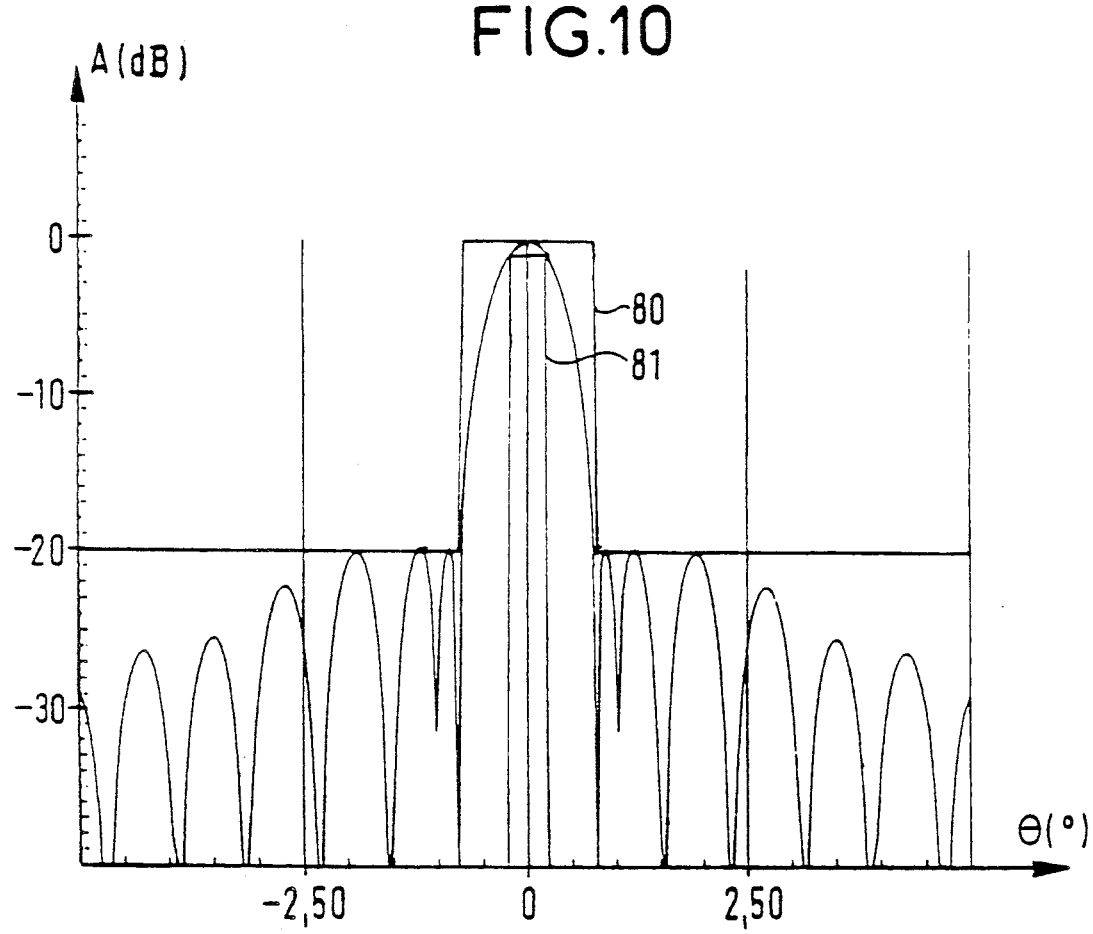

METHOD OF FORMING THE RADIATION PATTERN OF A HIGH EFFICIENCY ACTIVE ANTENNA FOR AN ELECTRONICALLY-SCANNED RADAR, AND AN ANTENNA IMPLEMENTING THE METHOD

BACKGROUND OF THE INVENTION

The invention relates to a method of forming the radiation pattern of a high efficiency active antenna for electronically-scanned radar, and to an antenna implementing the method.

Electronic scanning greatly increases the performance of radars, by virtue of its flexibility (number of possible operating modes) and its speed (quasi instantaneous beam shifting).

However the main drawback thereof is the very high number of phase control circuits required and often the very high number, of amplitude control circuits also required, thereby giving rise to losses, expense, mass, and power consumption which are often prohibitive.

Drawbacks relating to losses, expense, mass, and bulk have been overcome by mass-producing monolithic microwave integrated circuits (MMIC) on gallium arsenide. It is thus possible to make active transmit-receive (TR) modules very compactly which integrate the functions of phase-shifting, switching, transmission and reception, and amplification.

However, transmission power amplifiers made in MMIC technology have relatively low efficiency, and in addition their efficiency falls off if the output power level is varied.

In conventional designs, such variation in power level is essential both:

as a function of position to form a radiation pattern having low side lobe level (SLL); and as a function of time in order to modulate lobe width to adapt it to the mission.

As a result, the power consumption of this type of active radar antenna is prohibitive.

There exist several documents in the state of the art and in particular:

parts I and II of the article entitled "Array radars: an update", by Eli Brookner published in Microwave Journal (Feb. and Mar. 1987);

the article entitled "Applicability, availability, and affordability of GaAs MMICs in military systems" by Eugene H. Gregory, published in Microwave Journal (March 1987); and the article entitled "Affordable MMIC designs for phased arrays" by Ronald J. Naster, Anthony W. Jacomb-Hood, and Mark R. Lang, published in Microwave Journal (March 1987).

The first prior art electronically-scanned radars used diode or ferrite phase shifters for controlling beam de-pointing:

the major drawback of diode phase shifters is significant losses (several dB for 4/5-bit phase shifters), thereby requiring the already-critical power of the amplifiers to be increased; and although ferrite phase shifters have losses of less than 1 dB, they suffer from significant mass and bulk. These parameters become critical with airborne radars, and they prevent such radars being mounted on satellites.

An important advance was made when monolithic microwave integrated circuits (MMICs) on gallium arsenide started to be mass produced. This technology makes it possible to manufacture various types of microwave circuit having very low mass and bulk, at relatively low cost, and in mass production quantities, and in particular it can be used for manufacturing controllable attenuators and phase shifters.

The major drawback of MMIC phase shifters relates to significant losses (more than 5 dB for a 0°-360° C. phase shifter having analog control or 4/5-bit digital control). However this aspect is secondary when these phase shifters are associated with amplifiers:

either high power amplifiers (HPAs) situated downstream from transmit phase shifters, since the losses then take place at low level and have no effect on limiting the output power of the amplifiers, it merely being necessary to increase the gain of the output amplifiers a little;

or low noise amplifiers (LNAs) situated upstream from the receive phase shifters, since providing the gain of these amplifiers is adequate (20 dB to 30 dB), then the losses inherent to the phase shifters have substantially no deleterious effect on the noise factor of the receiver.

Transmit-receive (TR) modules are generally manufactured on a common (alumina) substrate by connecting together a plurality of gallium arsenide chips each performing an elementary function. These chips are themselves mass produced using doping (diffusion or ion implanting), masking, oxidizing, . . ., techniques based on those used for making logic integrated circuits on silicon. Silicon ICs have shown their capacity for reducing cost enormously, without loosing reliability.

By connecting together several hundreds or thousands of such MMIC-TR modules in an active radar antenna (called "active" because it includes active devices in the form of amplifiers), it is possible to reconcile the requirements of electronic scanning with cost, mass, and bulk, which are critical parameters for airborne radars and even more important for space radars.

The final critical parameter for such active radar antennas is their DC power consumption.

The added power efficiency of HPA amplifiers:

$$\eta a = (Pout - Pin)/PDC$$

is much lower in MMIC technology (by 15% to 20%) than in travelling wave vacuum tube technology which lies in the range 30% to 60% depending on the microwave waveband.

Efficiency is particularly poor when using class A (linear) HPAs while varying the input power and thus the output power: power consumption is determined by the bias currents and voltages which are set for the maximum Pout to be delivered. The same amount of power is consumed when Pin is reduced to reduce Pout.

An alternative consists in reducing bias voltages when a lower Pout is required. Power consumption is thus reduced, but considerably less than power output (in percentage or in dB). Efficiency $\eta a$ is thus significantly reduced.

However if high performance radiation patterns are to be formed, it is necessary:

at least to have one different Pout per TR module, so as to obtain the weighting required for illumination taper; and in some cases where the mission requires a lobe of variable width, it is also necessary to vary the illumination taper amplitude law as a function of time, thus requiring the Pout of the HPAs to be varied.

As a result, active radar antennas have hitherto confronted the following dilemma: a radiation pattern having low side lobe levels, and preferably also being capable of being modulated, can only be obtained by reducing the efficiency of the distributed HPAs.

The resulting increase in power consumption has so far restricted the generalization of active antennas for airborne radar applications, and even more for space radar applications where the available power is very limited.

An object of the present invention is to escape from this performance/power consumption dilemma by providing a method of forming the radiation pattern of a radar antenna which is particularly well suited to active antennas (i.e. antennas having distributed modules including transmit and receive amplifiers).

SUMMARY OF THE INVENTION

To this end, the present invention provides a method of forming the radiation pattern of a radar antenna optimized for active antennas having amplifiers distributed over the antenna immediately behind the radiating elements, which method makes it possible:

to dissociate the illumination laws and thus the radiation patterns in transmission and in reception;

to provide equal amplitude illumination in transmission to maximize the efficiency of transmit amplifiers which are all identical and to minimize their DC power consumption and dissipation, both of which are critical points for active antennas (operation in class B or in class AB);

to optimize the illumination law in reception by adjusting the gain in the receive path (using adjustable attenuators or variable gain last stages in the LNAs);

to obtain an identical phase law in transmission or in reception, thereby enabling reciprocal phase shifters to be used while being controlled at a moderate rate;

to synthesize radiation patterns of variable width by applying an appropriate phase law while changing neither the power of the transmit amplifiers nor the gain of the receive paths; and to control receive path gain during transmission so as to form radiation patterns of greater width and having sharper cutoffs, thereby improving the discriminating power of the radar.

Thus, the gain on the receive path of each TR type module is controlled so as to form a receive radiation pattern which is adapted to the transmit pattern, i.e. which has sensitivity lows where the transmit pattern has interferring side lobes:

the performance of a radar depends on the product $Ge \times Gr$ (transmit gain $\times$ receive gain) in a given direction specified but its angles $(\theta, \phi)$ in spherical coordinates;

reciprocal passive antennas have the same radiation pattern in transmission and in reception, i.e.:

$Ge(\theta, \phi) = Gr(\theta, \phi)$; whereas an active antenna of the invention having different radiation patterns provides the same performance as a reciprocal antenna having a radiation pattern $Ger(\theta, \phi)$ given by:

$Ger(\theta, \phi) = \sqrt{Ge(\theta, \phi) \times Gr(\theta, \phi)}$

Ger is called the equivalent transmit-receive pattern.

When compared with the pattern obtained by the conventional method where Ge is equal to Gr, it can be seen that better performance is obtained.

The invention thus relates to a method of synthesizing radiation patterns of variable width and having low side lobe levels by varying the gain of its TR modules in reception only, while operating in transmission at a level which is constant over the area of the antenna and over time.

By adapting the receive pattern to the transmit pattern, very good transmit/receive performance is obtained, and the invention provides the fundamental advantage of retaining acceptable efficiency in the distributed transmit amplifiers. Power consumption becomes significantly lower both in airborne radars and in space radars.

The fundamental advantage of the invention is that gain adjustment in the TR modules takes place only on reception, thereby having no effect on the power consumption of the antenna. The additional power dissipated on the receive paths is negligible compared with the power dissipated by the HPAs since the level of the received signals (echoes of the transmitted pulses) is at least 100 dB below the level of the transmitted signal.

By using active modules that are all identical (e.g. in MMIC technology), costs are reduced by the mass production effect since the modules can be dimensioned for a power level that is lower than the maximum level that would be required by amplifiers of different gains or of variable gain. By causing all of the HPAs to operate at the same output power, their efficiency is optimized, thereby reducing power consumption, and this is a critical point for active antennas.

Beam width can be varied by controlling the phase shifters only, and by controlling them in the same manner both for transmission and for reception (thereby limiting the reconfiguration rate).

This thus has the additional advantage of limiting the number of control signals.

Advantageously, an antenna may be provided having active modules which are distributed non-uniformly in one of its dimensions, thereby making it possible to reduce the number of modules considerably. When the electronic scanning takes place in a single plane only, the method of the invention is applied to said single plane, in which case amplitude weighting in the other plane is identical both in transmission and in reception in the other plane, generated by the physical distribution of the active modules. Overall, an active antenna is provided in which the transmit amplifiers all operate at the same level, and in which the illumination law and the radiation patterns in the two main planes of the antenna (azimuth, elevation) are "separable".

BRIEF DESCRIPTION OF THE DRAWINGS

Embodiments of the invention are described by way of example with reference to the accompanying drawings, in which:

FIGS. 5a to 22 are transmit and/or receive radiation patterns (in parts A thereof) showing how the method of the invention operates, together with the corresponding source excitation curves (in parts B);

DETAILED DESCRIPTION OF THE PREFERRED EMBODIMENTS

Figure 1:
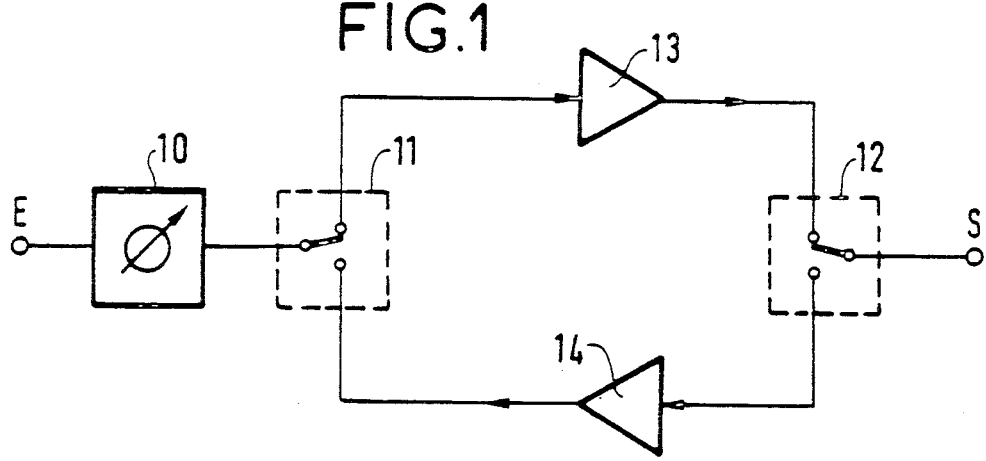
FIG. 1 is a diagram of a prior art TR module.
Figure 2:
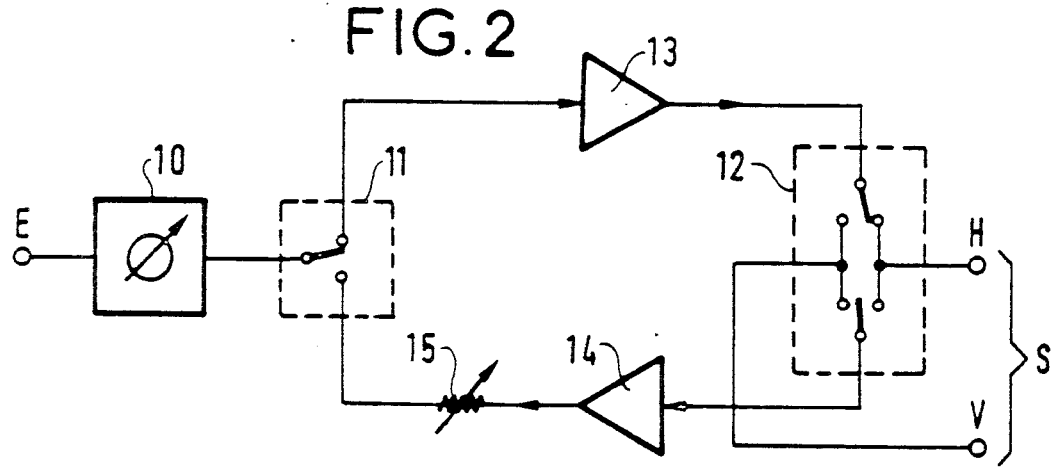
FIGS. 2 and 3 are circuit diagrams of TR modules modified in accordance with the invention.
Figure 3:
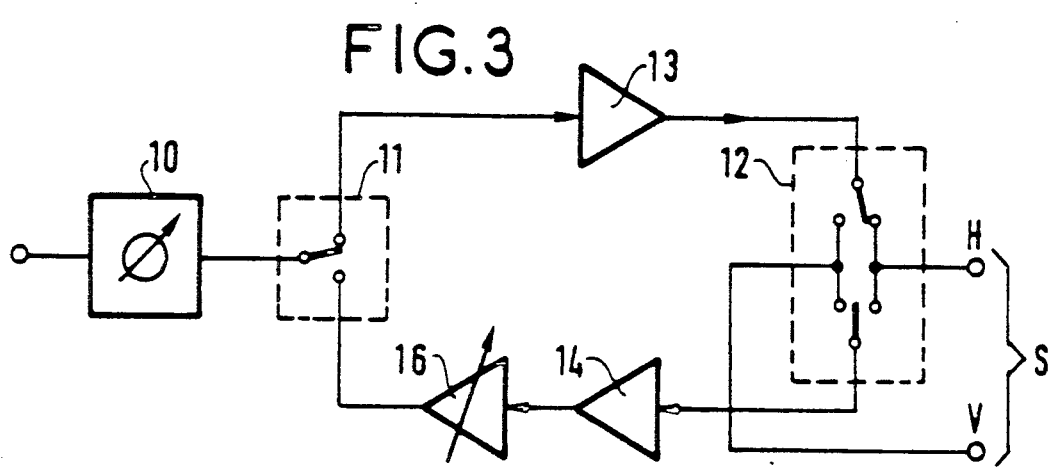

The structure of the active transmit/receive (TR) modules is based on the conventional TR module structure shown in FIG. 1 which comprises a transmit input E connected to an active element of the radar and a transmit output S connected to a radiating element of the antenna, a digital phase shifter 10 and a head-to-tail parallel connection between first and second switches 11 and 12 of a high power amplifier (HPA) 13 for transmission and a low noise amplifier (LNA) 14 for reception. Gain control is provided in the receive path of this structure. This gain control can be provided in two different ways:

either by adding a variable attenuator 15 after the LNA as shown in FIG. 2;

or else by controlling the gain of the last stage of the LNA by means of a two-gate field effect transistor (FET) 16 having one gate serving conventionally as an input port and having its other gate modulating its gain when the bias voltage applied thereto is varied (see FIG. 3).

All of the HPAs operate continuously at output power. This can thus be maximized and efficiency can be optimized by making them operate in their compression region or in their saturation region. It is thus possible to use class B or class AB amplifiers whose DC power consumption and whose dissipation are considerably lower (for constant Pout) than in amplifiers used in their linear region (class A). Class A amplifiers would be essential if any attempt were to be made to vary transmit power.

The output switch 12 is a double-pole double-throw (DPDT) output switch which simultaneously provides transmit-receive switching and two ports leading to the radiating elements (two polarizations: horizontal polarization H and vertical polarization V). It is well adapted to being implemented as an integrated circuit (MMIC technology) being very small in size and in mass.

However, in the prior art such a configuration presents technical problems for very high power HPAs. Under such circumstances a solution is adopted (not shown in the figures) which includes a circulator followed by a single-pole double-throw output power switch. The LNA then needs to be protected by a limiter.

Although the method of the invention is applicable to two dimensional synthesis where the amplitudes Amn and the phases $\phi$mn of all of the radiating elements are independent, the results described relate to a simplified case for a rectangular antenna having separable illumination.

In fact, this is the technique which is applied in most radars, and in particular in airborne or space radars operating as synthetic aperture radars (SAR):

the radiation pattern in the main elevation plane (the vertical plane including the normal to the antenna) is synthesized independently from the radiation pattern in the main azimuth plane (the horizontal plane including the normal to the antenna);

the elevation pattern $G^{el}(v)$ with $v=(H/\lambda)$ sin El and where El is the angle from the normal in the elevation plane, is related to the illumination law $E^{el}(y)$ on the vertical axis of an antenna of height H operating at a frequency where its wavelength in vacuo is $\lambda$ as follows:

$$G^{el}(v) = |F^{el}(v)|^2, \text{ where}$$

$F^{el}(v)$ is the complex Fourier transform of $E^{el}(y)$, with the modulus of El representing the source excitation amplitude at Y-coordinate y, and the argument of El representing the phase of said excitation;

similarly, the azimuth radiation pattern $G^{az}(u)$, where $u=(L/\lambda)$ sin Az, Az being the angle from the normal in the azimuth plane, is related to the illumination law $E^{az}(x)$ on the horizontal axis of an antenna of length L, by:

$$G^{az}(v) = |F^{az}(v)|^2, \text{ where}$$

$F^{az}(v)$ is the complex Fourier transform of $E^{az}(x)$, representing the amplitude and phase of the excitation for the source of X-coordinate x.

All amplitudes are normalized to a maximum of 1 (or 0 dB) and all phases are taken to within a constant.

The source (or radiating element) excitation at position (x, y) is thus $E^{az}(x) \times E^{el}(y)$, and the radiation pattern in the direction $\theta$, $\phi$ is then:

$$G(\theta, \phi) = |F(\theta, \phi)|^2, \text{ where}$$

Figure 4:
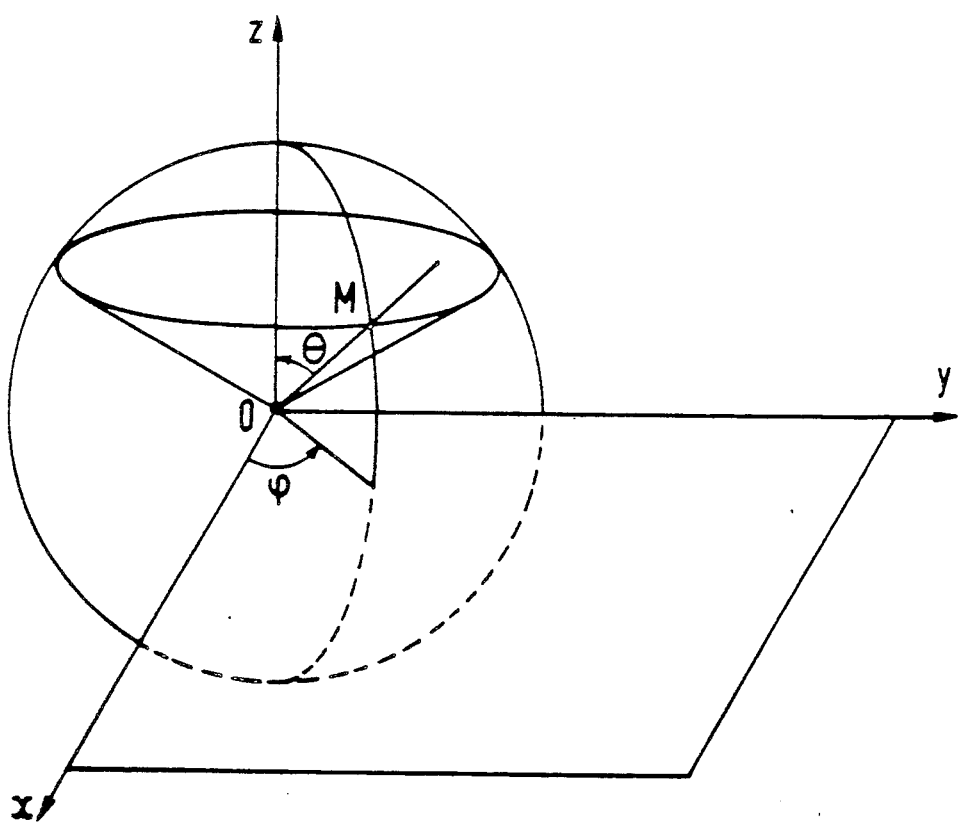
FIG. 4 is a diagram showing a system of spherical coordinates.

$F(\theta, \phi) = F^{az}(u) \times F^{el}(v)$  $u=(L/\lambda)$ sin $\theta \cdot$cos $\phi$
$G(\theta,\phi) = G^{az}(u) \times G^{az}(v)$  $v=(L/\lambda)$ sin $\theta \cdot$cos $\phi$ where $\theta$ and $\phi$ are the conventional Euler spherical coordinate angles, $\theta$ being taken relative to the normal Os to the antenna and $\phi$ being taken relative to the horizontal axis Ox, as shown in FIG. 4.

Thus, in each of the main planes xOz (azimuth) and yOz (elevation), this reduces to synthesizing a one-dimensional radiation pattern generated by an alignment of sources (a linear array).

For a radar antenna operating in transmission, and then in reception, the radiation pattern is applied twice over:

on transmission, it concentrates the transmitted energy in the desired direction while simultaneously avoiding exceeding a fixed side lobe level in all other directions (e.g. SLL = −20 dB); and on reception, a signal coming from a direction other than the aiming direction is again weighted by the radiation pattern. Overall, the discriminating power of the radar depends on the product $Ge(\theta, \phi) \times Gr(\theta, \phi)$, = transmission pattern × reception pattern. In dB, the effects of the two patterns are summed. If the side lobe level is −20 dB on transmission and −20 dB on reception, then attenuation in directions other than the aiming direction is 40 dB.

However in order to be able to compare different patterns Ge and Gr with a conventional pattern where Ge is equal to Gr (conventional antennas without amplifiers are reciprocal and their transmit and receive patterns are identical), an equivalent "transmit-receive" pattern is drawn:

$$Ger(\theta, \phi) = \sqrt{Ge(\theta, \phi) \cdot Gr(\theta, \phi)}$$

i.e. the single equivalent pattern which, if used both on transmission and on reception, would give rise to the same overall result in a radar application (i.e. the same product Ge.Gr).

Consider, by way of example, synthesizing a narrow lobe using 128 sources, with the distance between sources being 0.57λ, at each elementary source being omnidirectional.

Figure 5A:
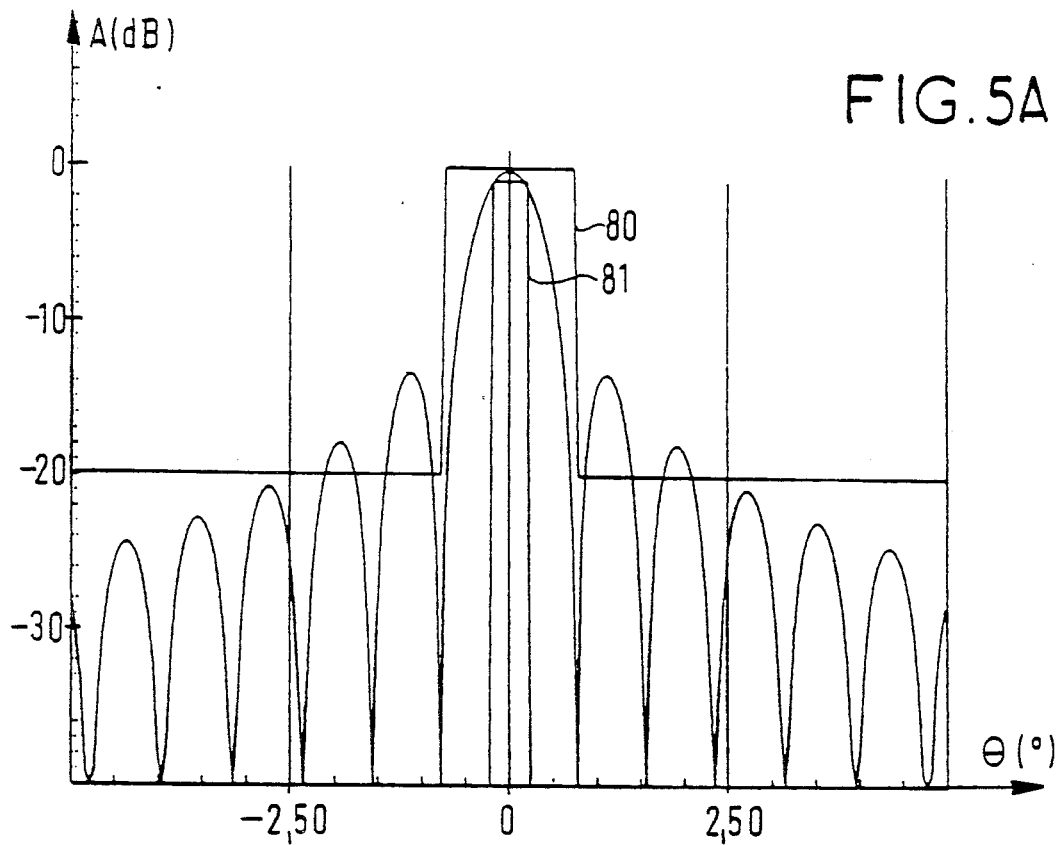
Figure 5B:
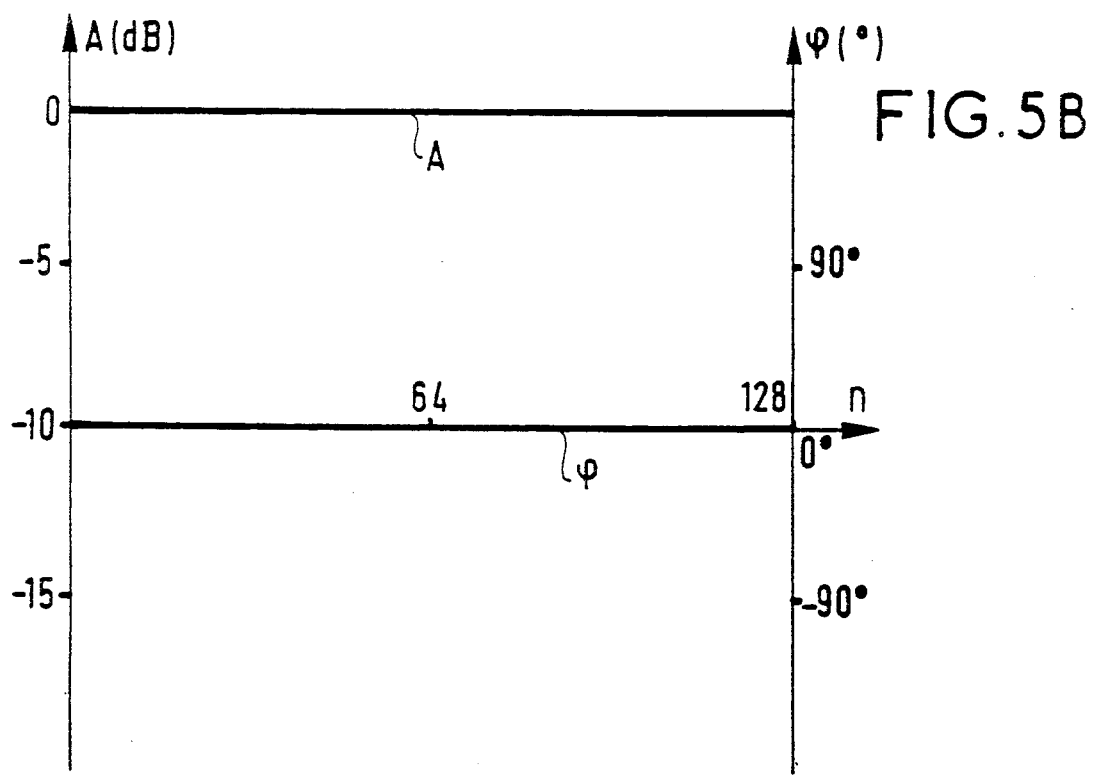

FIG. 5A shows the transmit pattern obtained using uniform illumination as shown in FIG. 5B (using 128 patch lines) i.e. equal amplitude illumination (all of the HPAs are operating at the same level) and equal phase illumination (in order to obtain a narrow lobe).

Figure 6A:
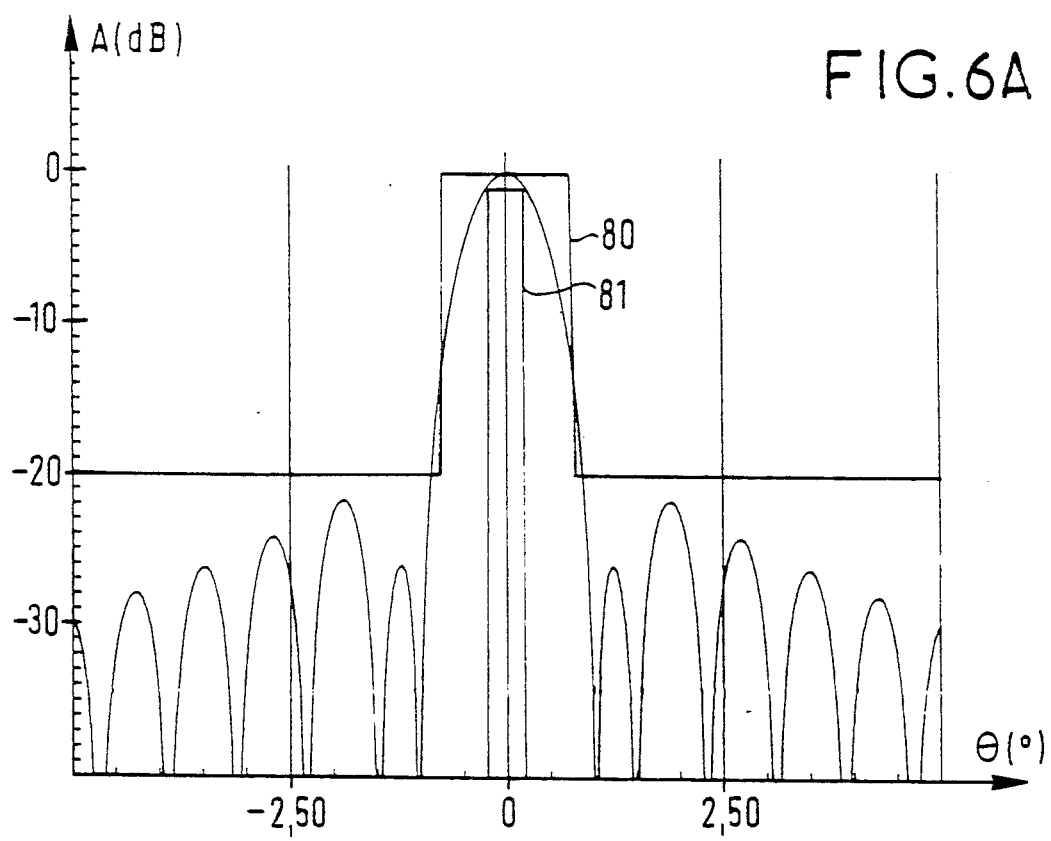
Figure 6B:
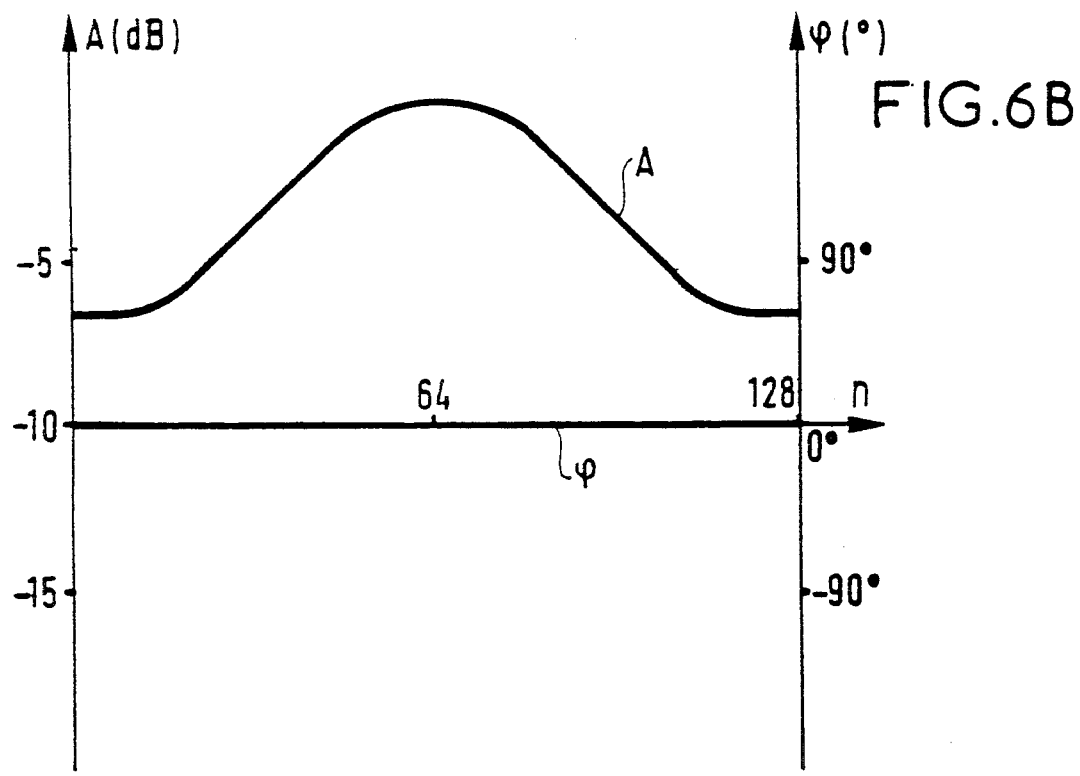

FIG. 6A shows the receive pattern: the illumination shown in FIG. 6B is still equiphase but adapted amplitude weighting serves to lower the first side lobes relative to the following side lobes.

FIG. 7 shows the equivalent transmit-receive pattern, whose performance is excellent:

the secondary side lobe level is close to −20 dB which was the target level in this particular case;

the base of the main lobe is narrower than for the patterns obtained by synthesis in one direction only; this is a fundamental quality, particularly for SAR radiation patterns which are required to limit ambiguity as much as possible, i.e. to attenuate close echoes as much as possible both in elevation and in azimuth;

directivity performance is specified by "illumination efficiency" $\eta i$ which represents the loss of directivity due to the amplitude and phase law compared with a uniform law (where a uniform law gives a directivity of $(2L/\lambda)$ for an alignment of length L).

The loss in dB on the equivalent transmit-receive pattern is $\eta i = \frac{1}{2}(\eta_i^e + \eta_i^r)$, where $\eta_i^e$ and $\eta_i^r$ are the illumination efficiencies of the transmit and receive laws, respectively.

The resulting efficiency $\eta i$ (−0.16 dB) is as good as that which can be obtained for the best (so-called "Taylor") laws which provide the same SLL≈−20 dB) in one direction only.

Curves 80 and 81 shown in the A portions of the figures are respectively the outer and the inner limit characteristics, both of which are design requirements.

If gain quantification is used on reception, the amount of deterioration is small.

For practical reasons, it is preferable to simplify gain adjustment in the TR modules on reception and thus to control the amplitude law by quantizing the gain to a limited number of levels.

Figure 8A:
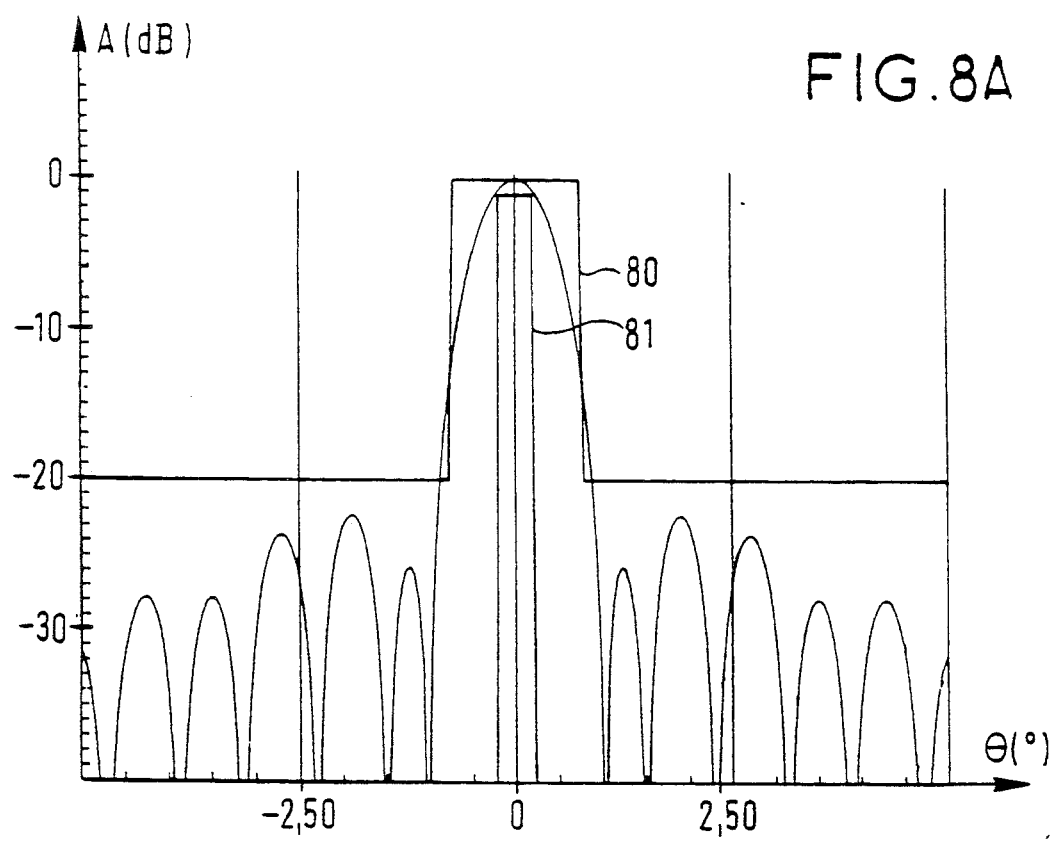
Figure 9A:
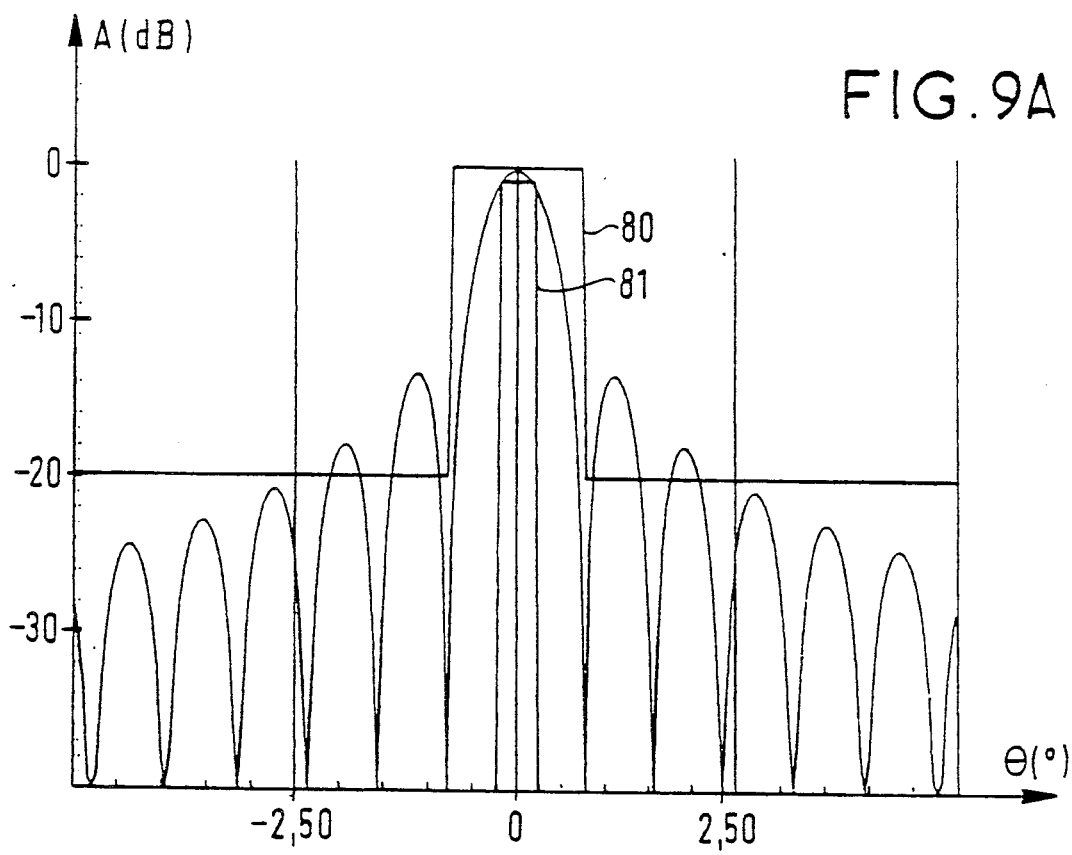
Figure 9B:
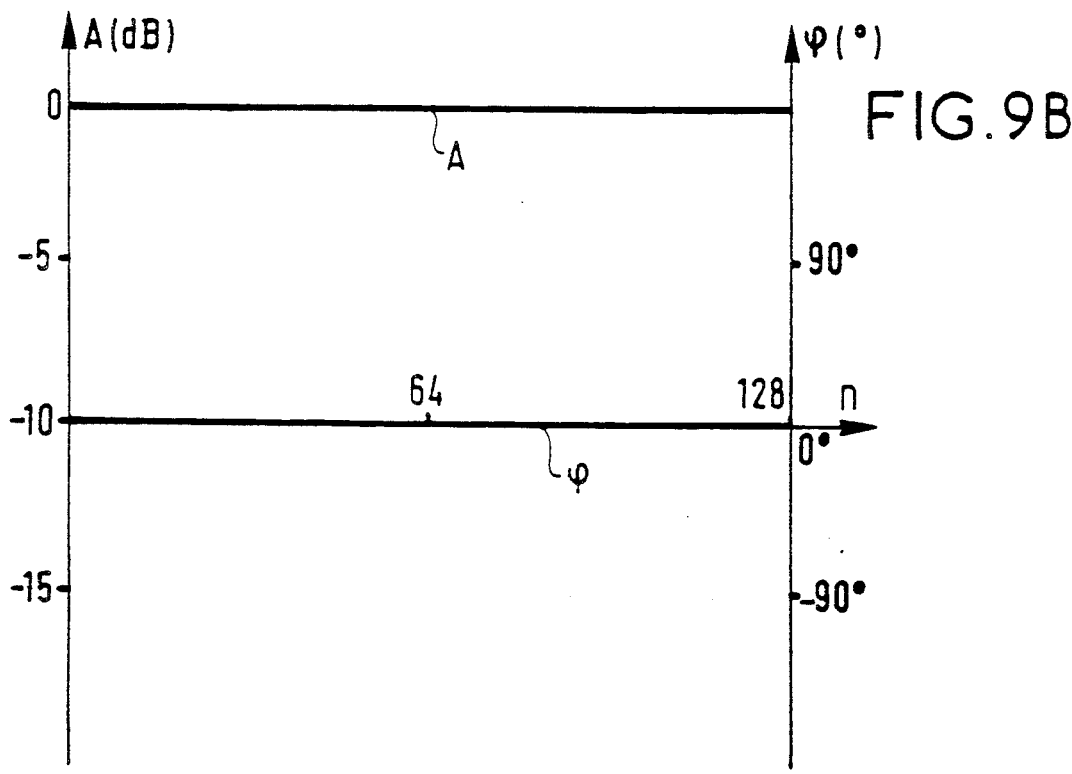

FIGS. 8A, 9A, and 10 are respectively the receive, the transmit, and the transmit-receive radiation patterns. They show that a suitable quantization scheme using eight levels (and thus 3 bits) suffices to have a receive illumination law close to that of "continuous control" (FIG. 6), and to obtain a radiation pattern of similar quality. Using 128 omni-directional sources separated by 0.57λ, the overall illumination efficiency is just as good (−0.16 dB).

Figure 11A:
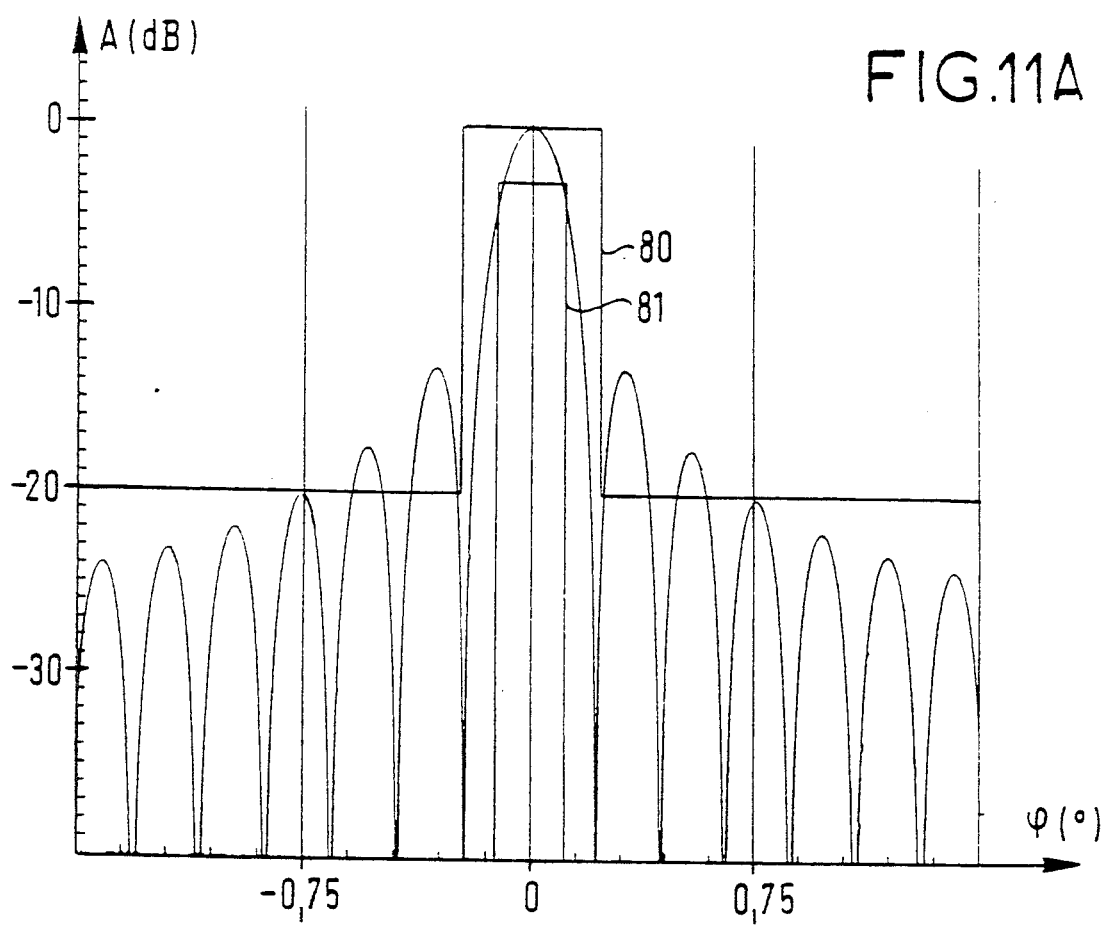
Figure 11B:
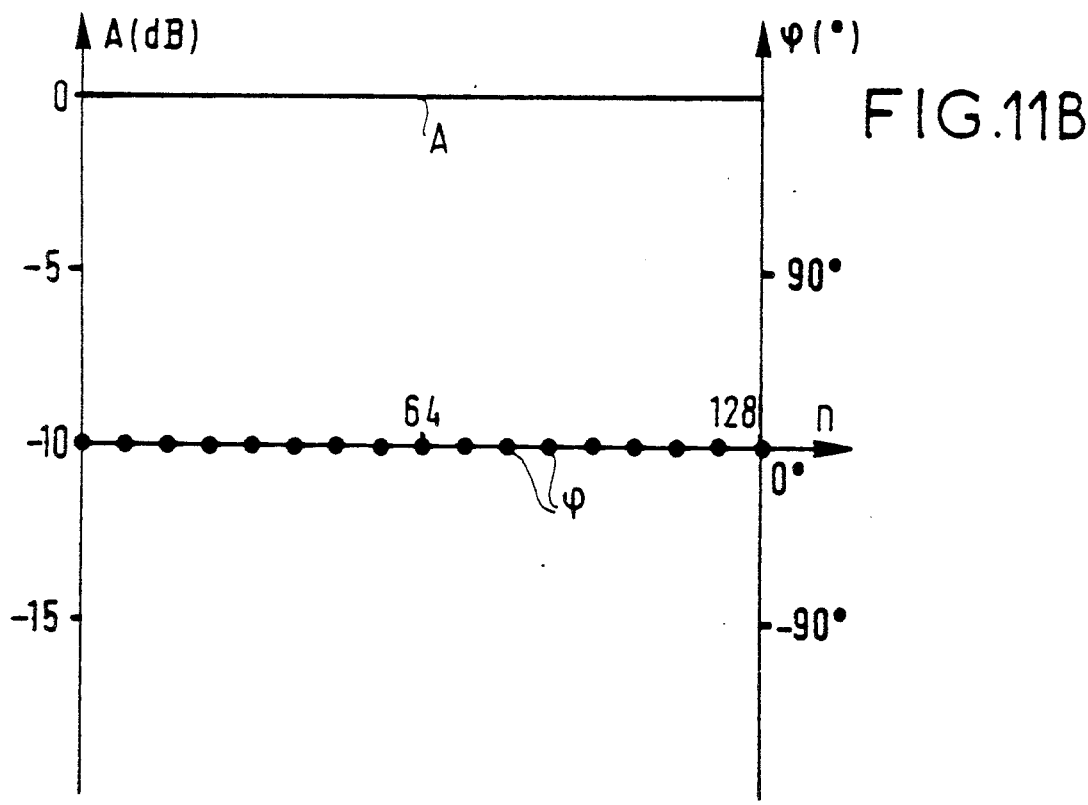
Figure 12A:
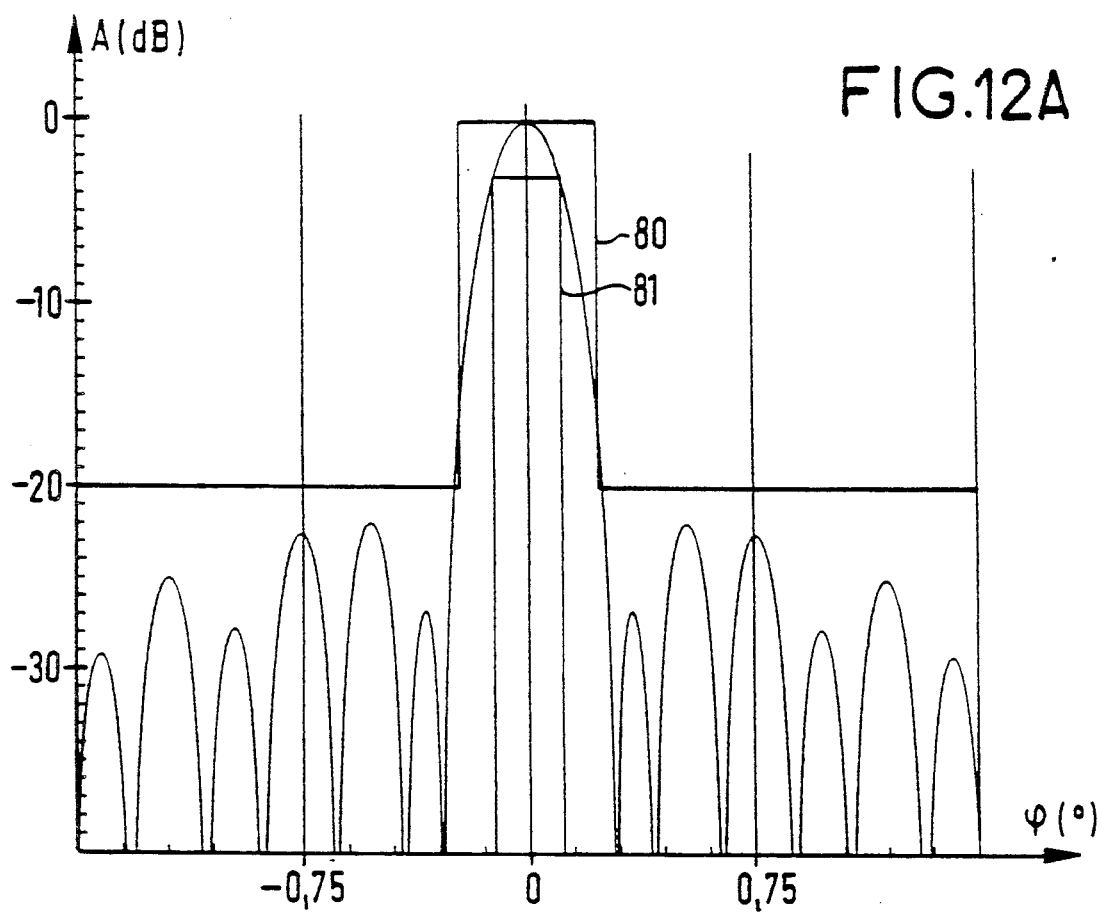
Figure 12B:
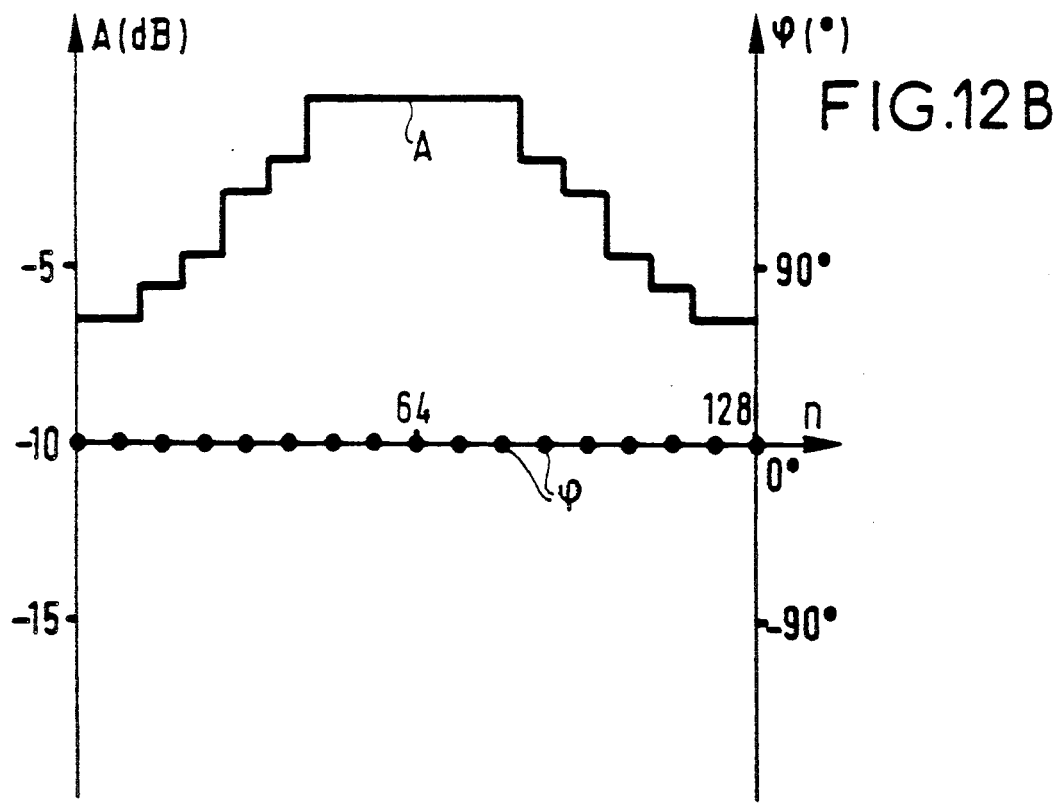
Figure 13:
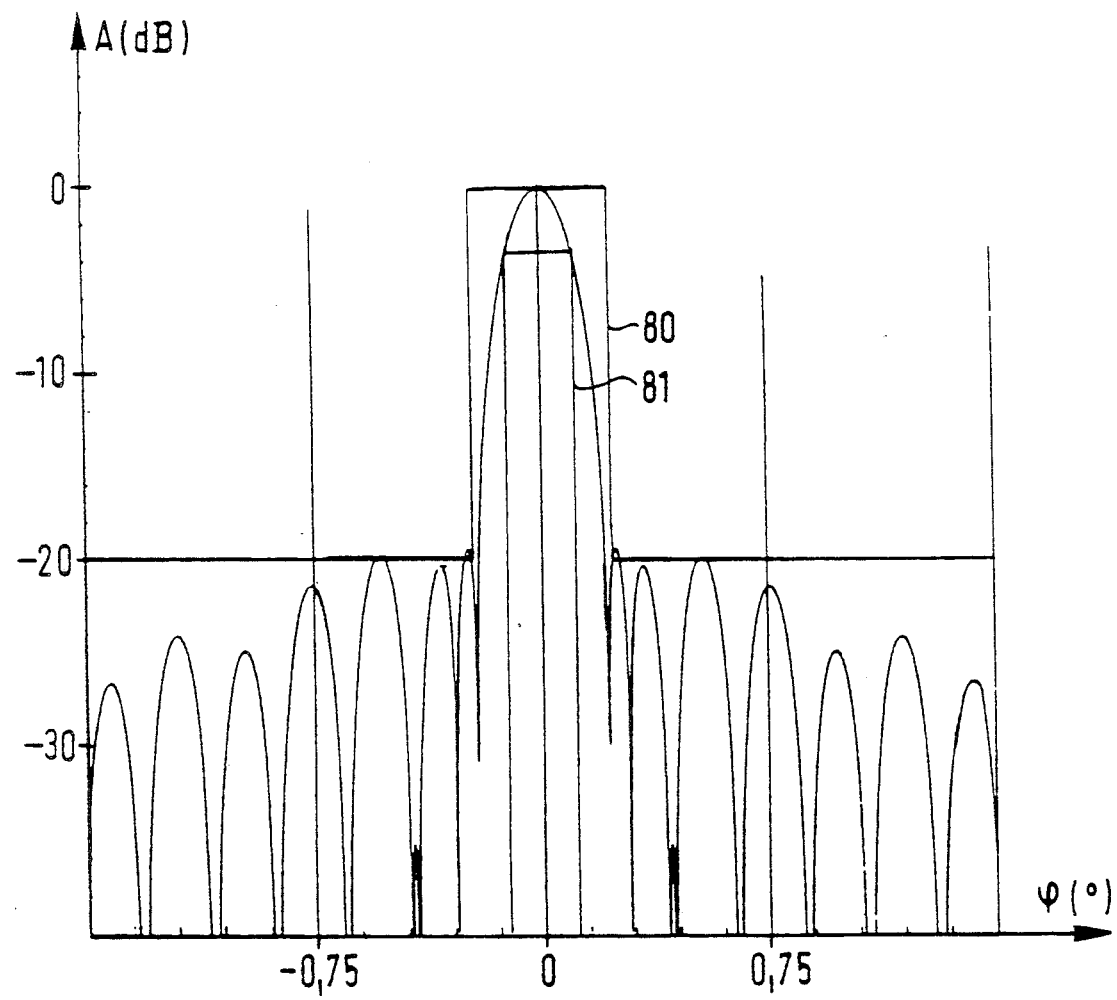

A narrow lobe may also be synthesized using only 17 amplitude controls. FIGS. 11A, 12A and 13 are respective transmit, receive, and transmit-receive radiation patterns showing that even if the number of feed points to the antenna (and thus amplitude control points) is greatly reduced, and if quantization is kept to 8 levels only, the above-described method produces an equivalent transmit-receive radiation pattern of similar quality. This applies to an active antenna for space SAR, the antenna having a length of 8.16 meters, and being split up into 17 subpanels each having a length of 48 centimeters, with the subpanels being controlled in amplitude only, thereby making it possible to use identical distributors within each of the subpanels. The overall illumination efficiency that is obtained is nearly as good (−0.18 dB).

The method may be generalized to an arbitrary number of active modules above a minimum number of about ten in the antenna dimension under consideration.

Figure 8B:
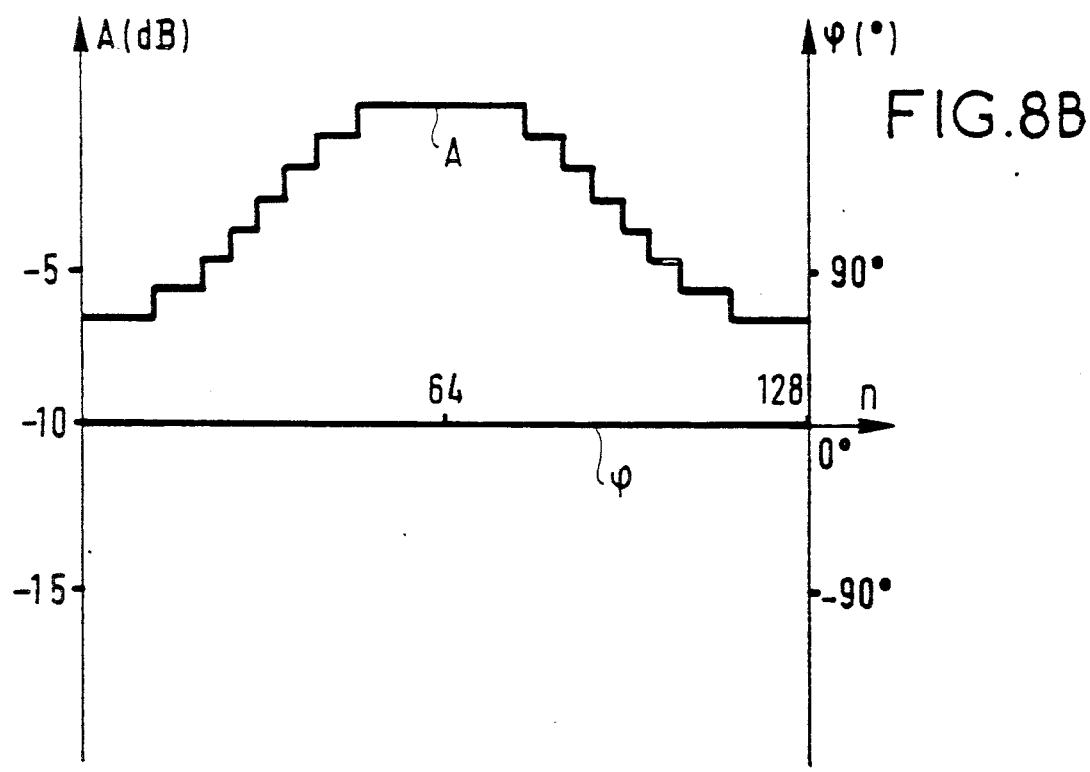
Figure 14A:
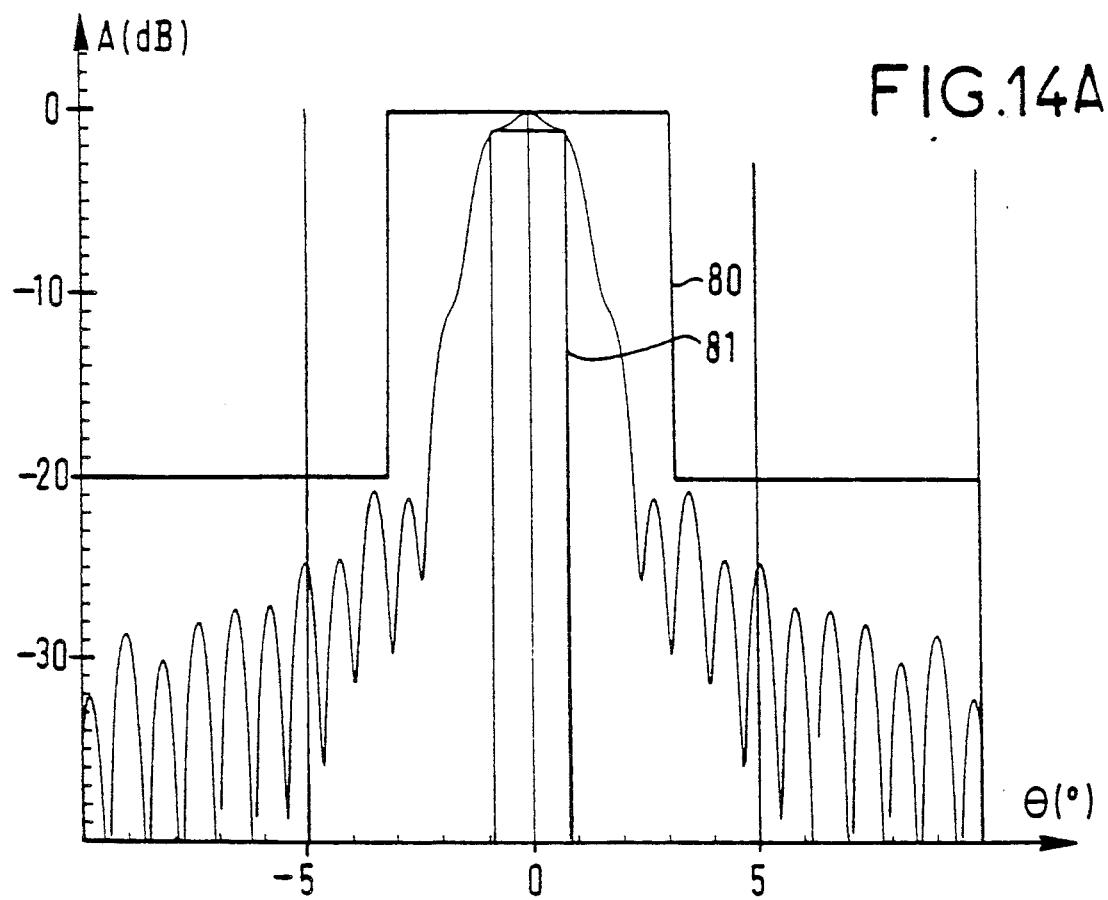
Figure 14B:
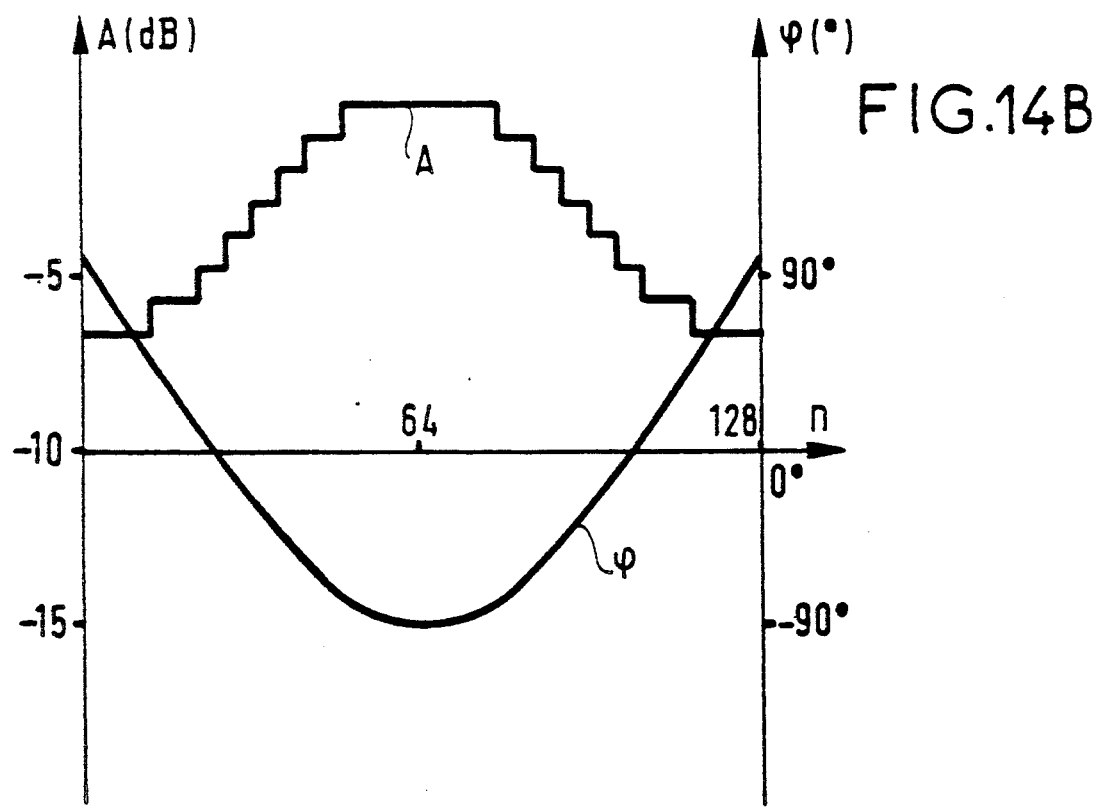
Figure 15A:
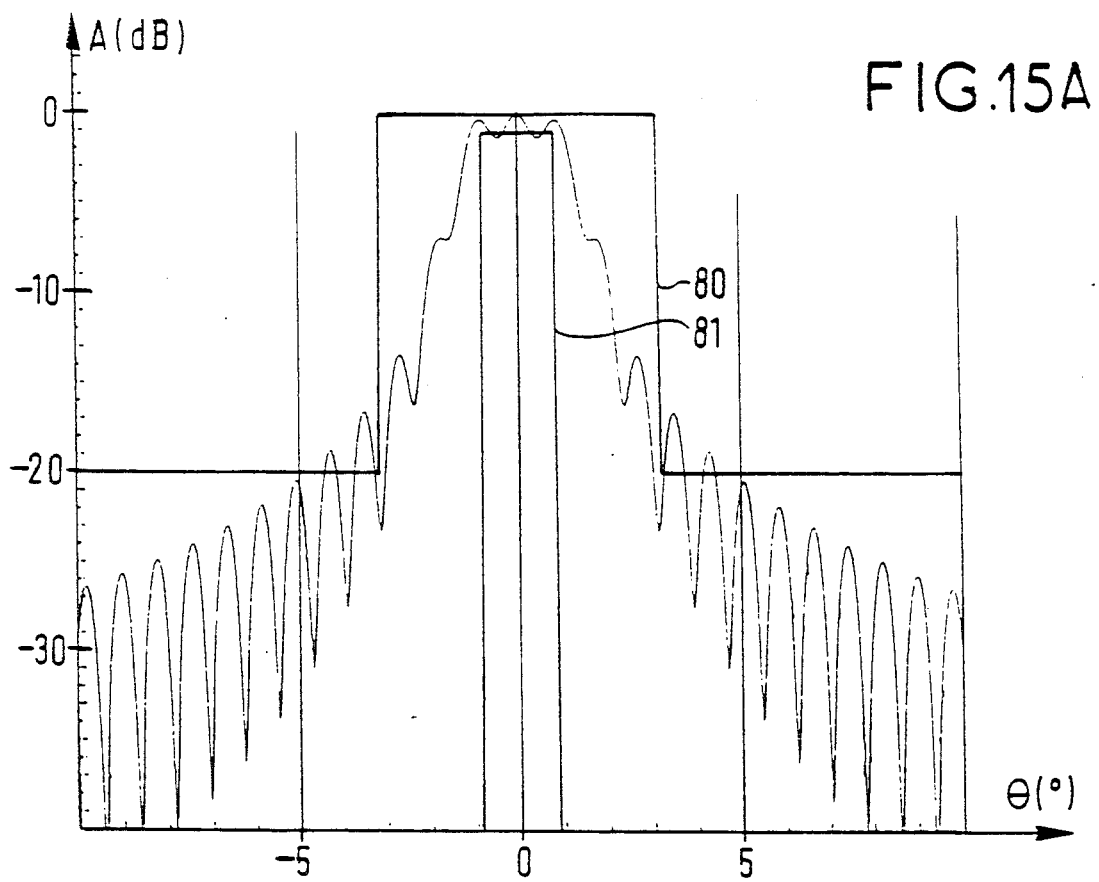
Figure 15B:
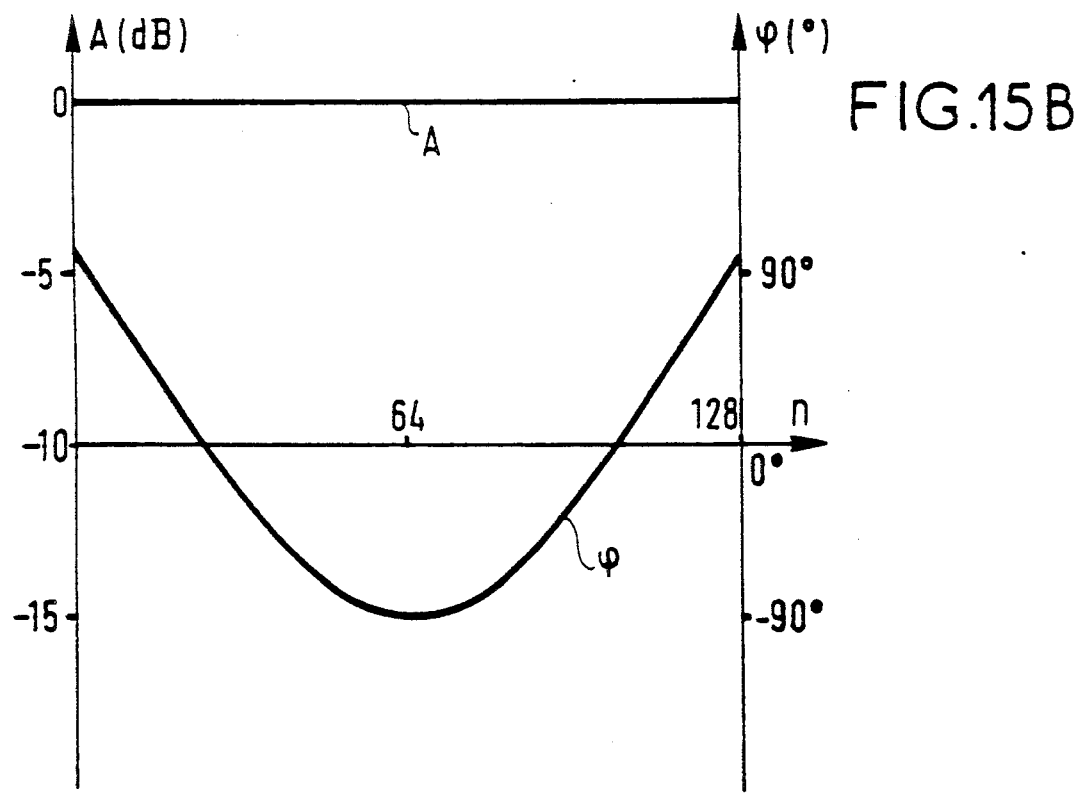
Figure 16:
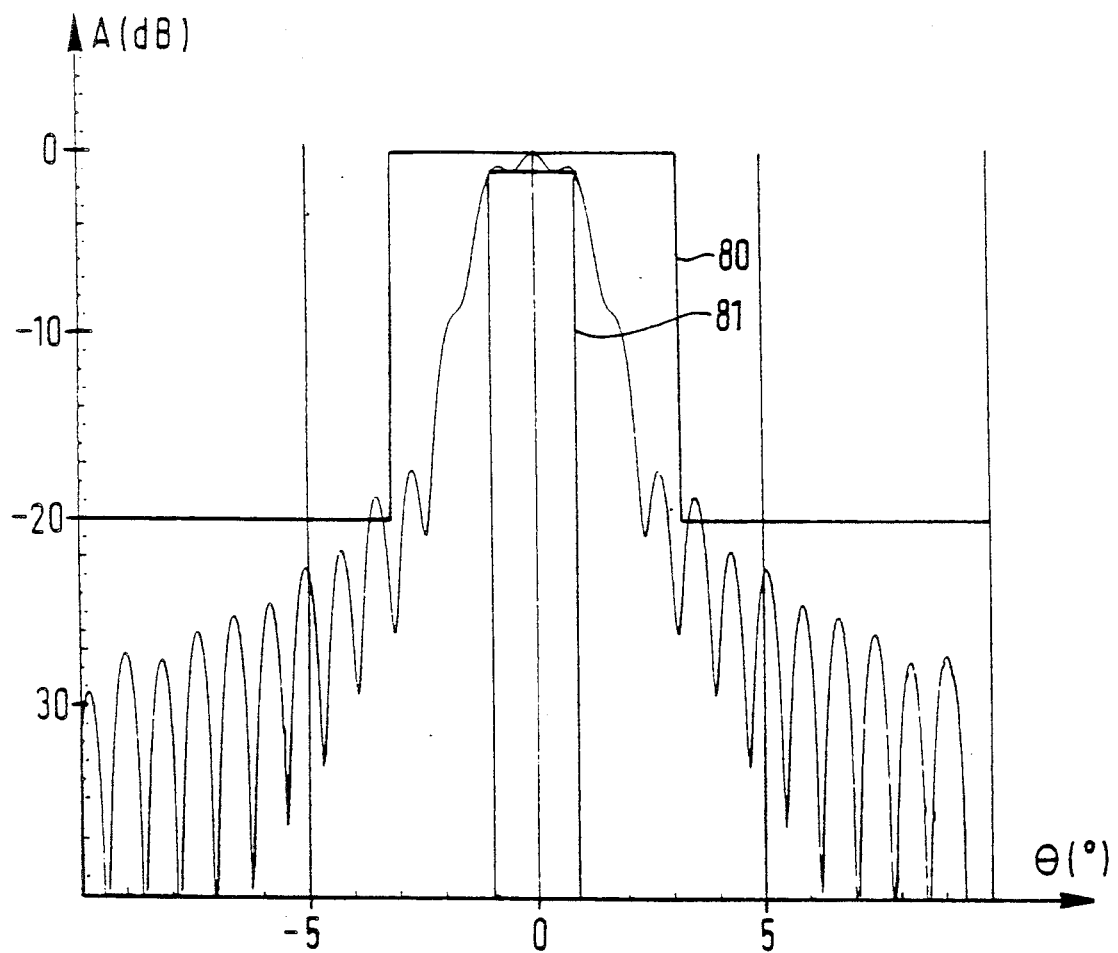
Figure 17A:
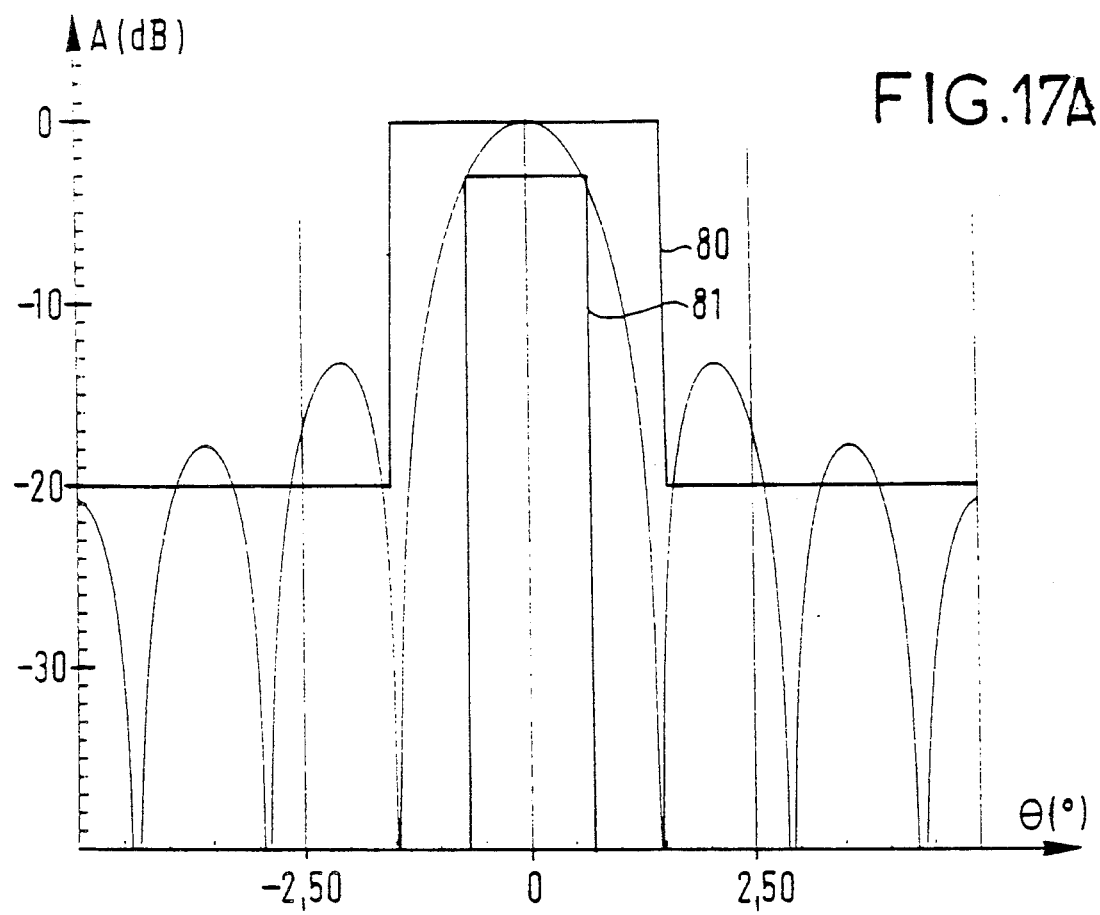
Figure 17B:
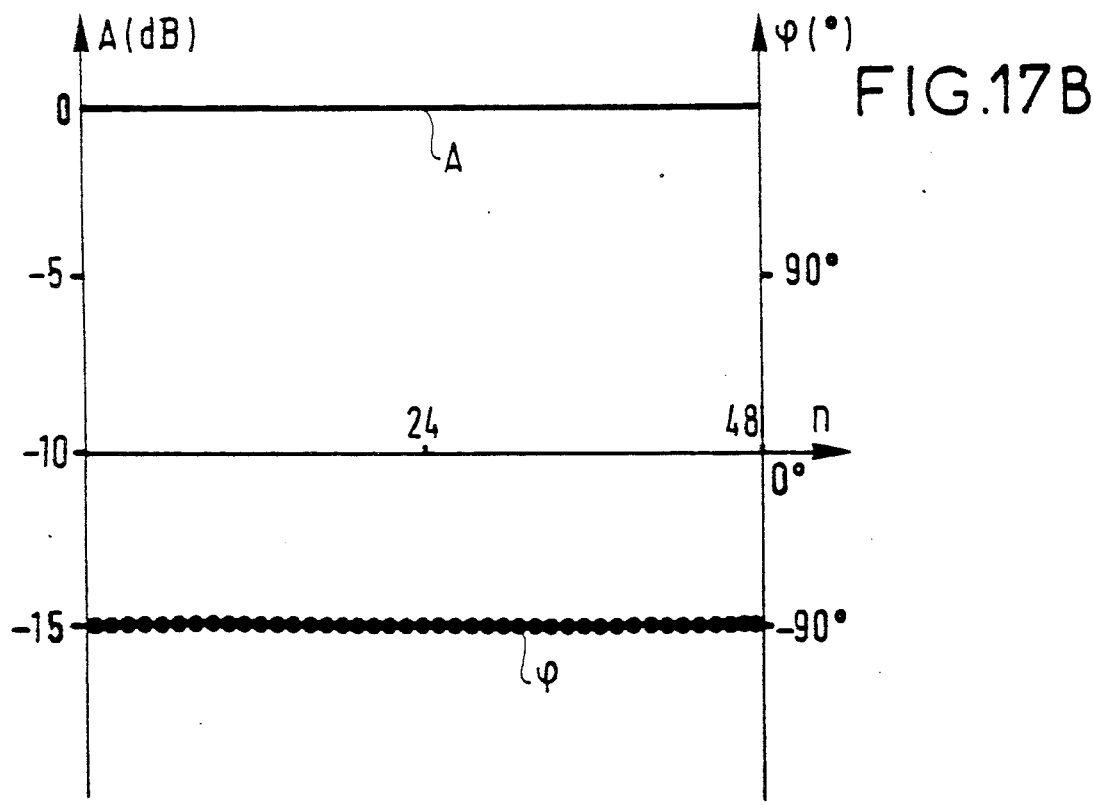
Figure 18A:
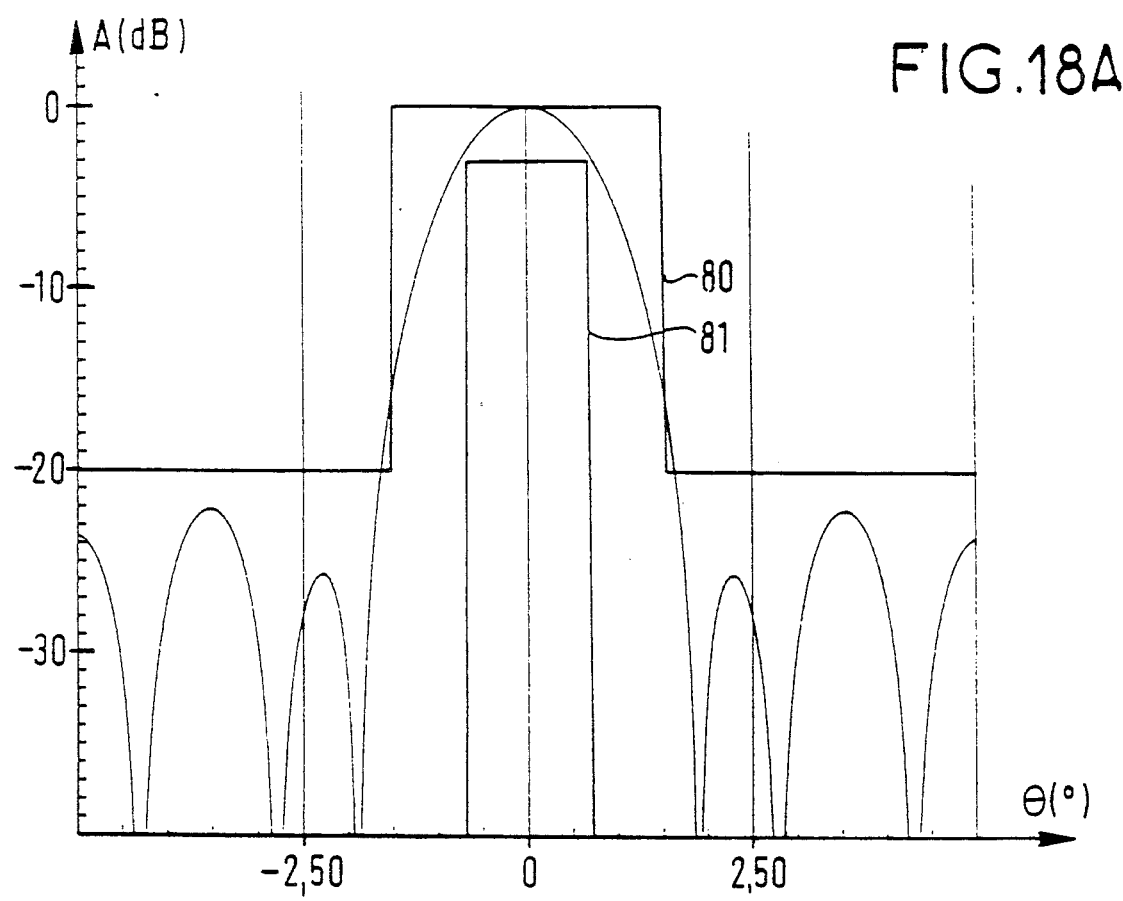
Figure 18B:
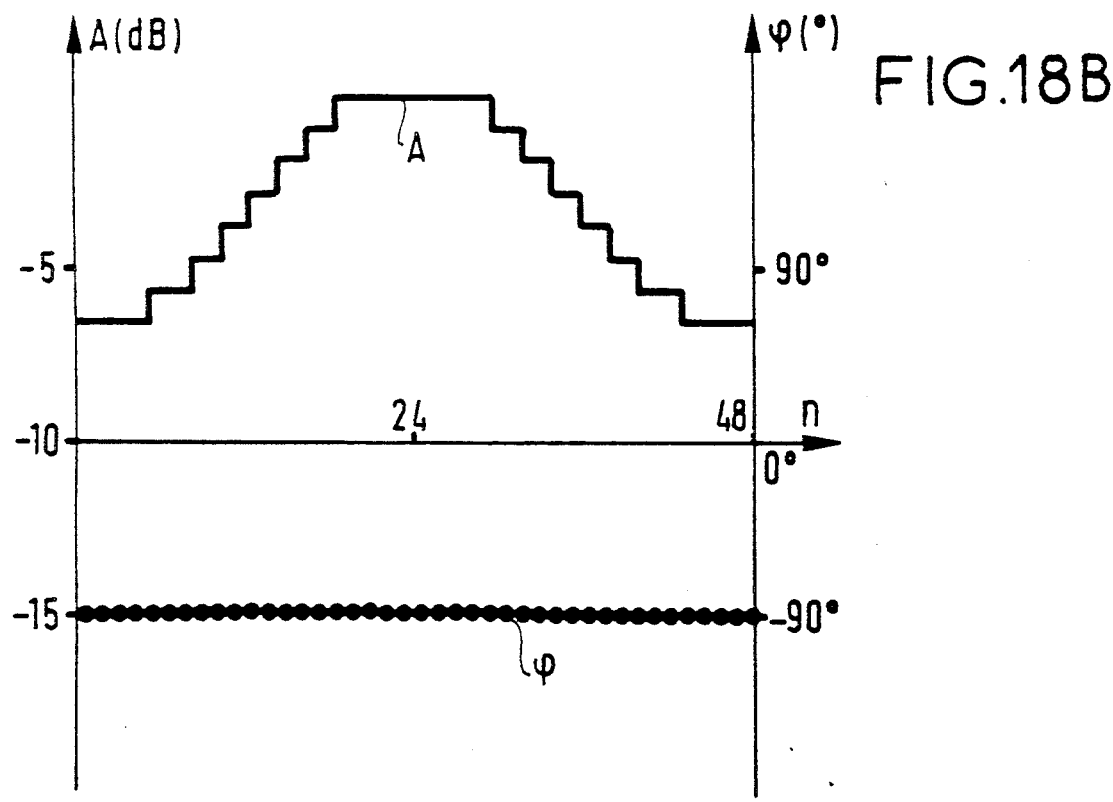
Figure 19:
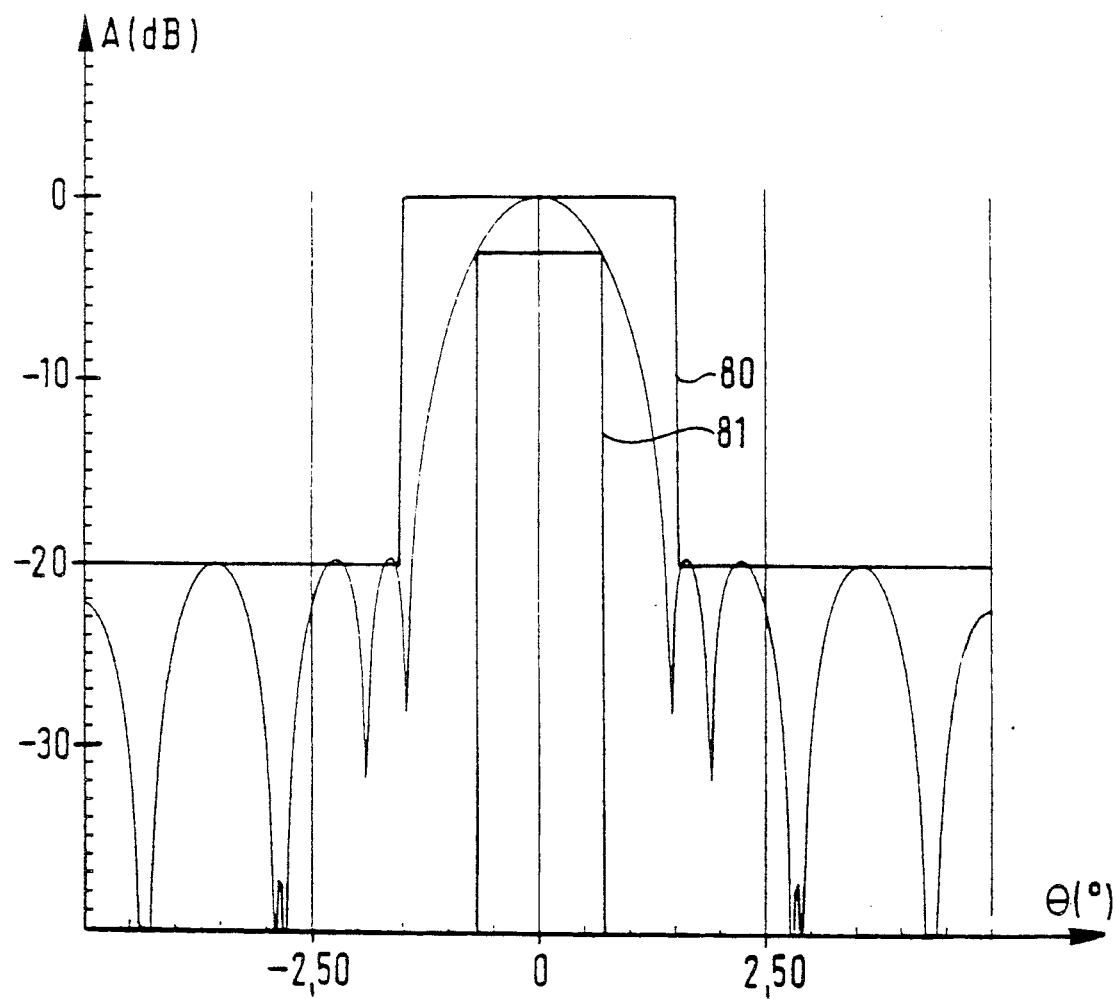
Figure 20A:
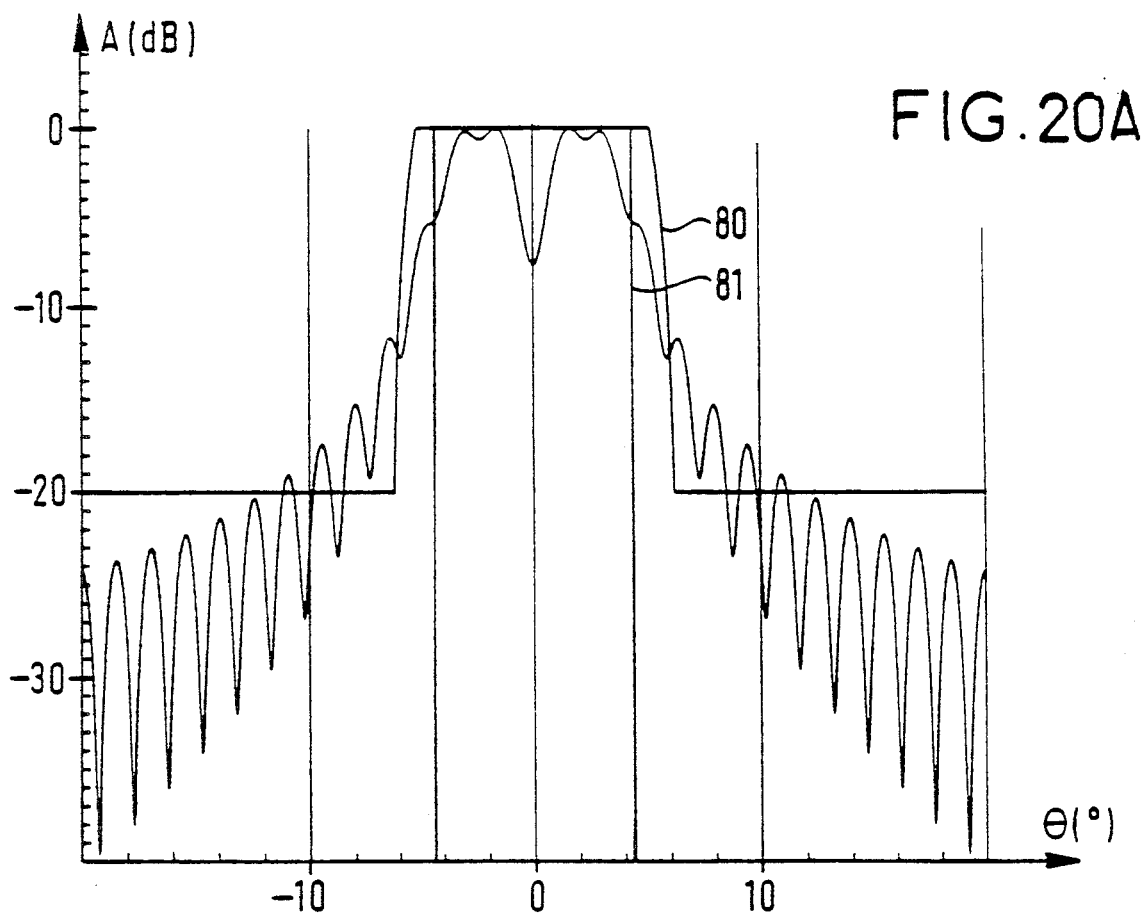
Figure 20B:
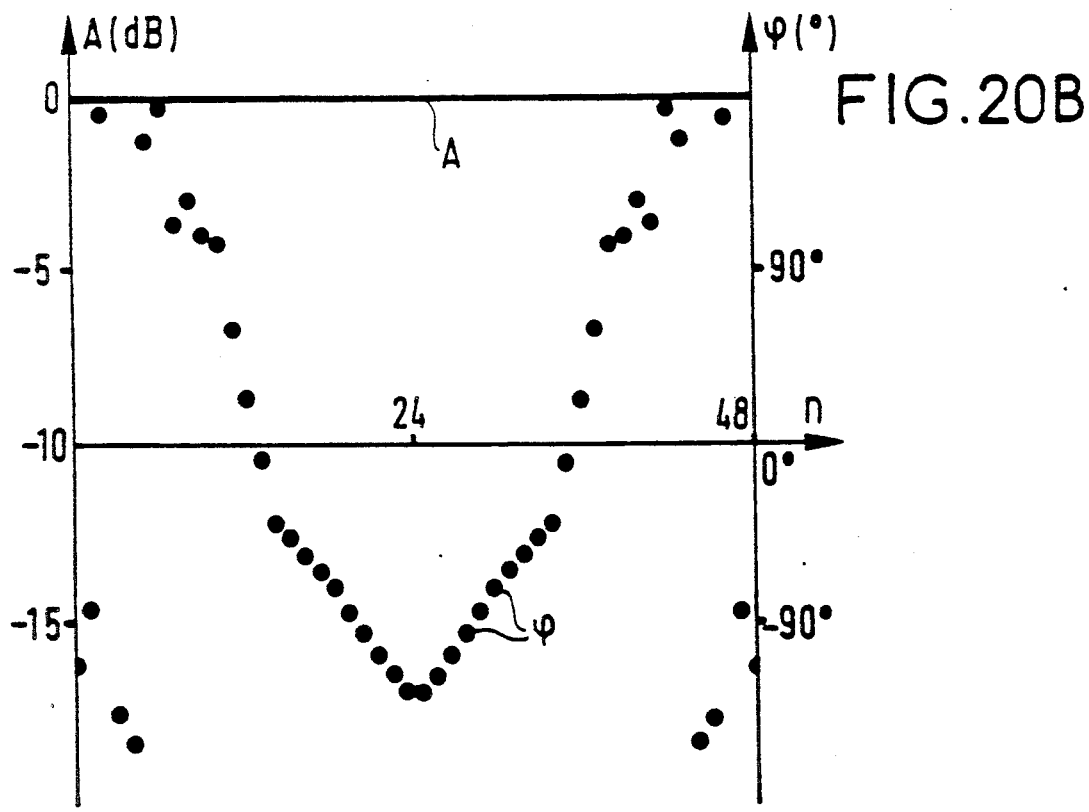
Figure 21A:
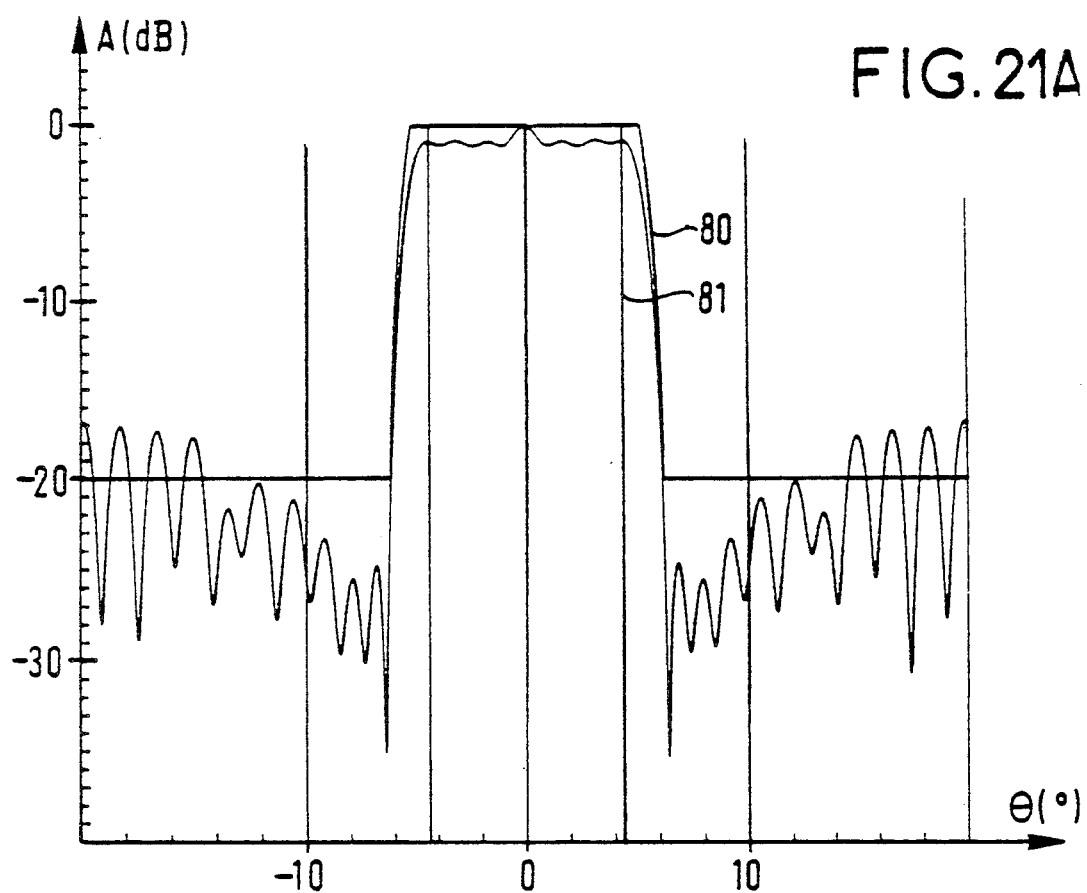
Figure 21B:
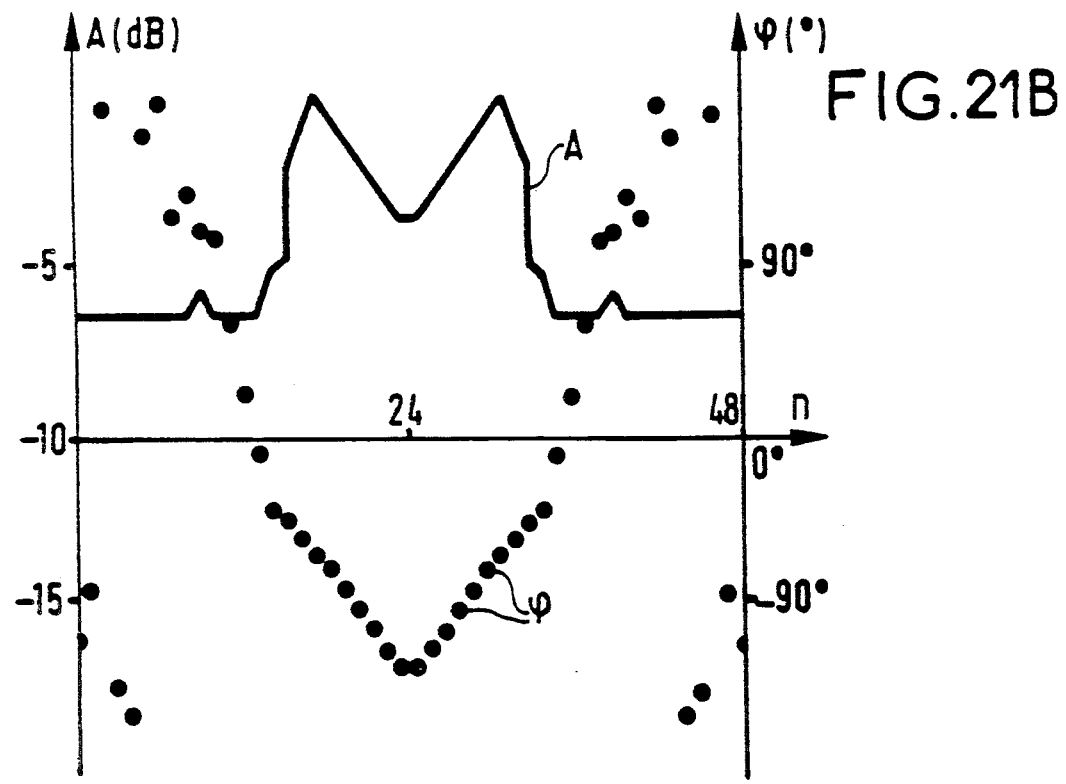

It is also possible to synthesize a lobe which is widened by using the phase shifters only while retaining the same equal-amplitude transmission law (same output power HPAs) and the discovered weighing law in reception (quantized as shown in FIG. 8). For example, a parabolic type phase law may be added if the mission requires a broad lobe (e.g. in side looking airborne radar (SLAR) mode for imaging the ground by generating pixels of brightness proportional to the intensity of the echo received from each revolution cell or SAR) if it is desired to maintain a ground swath of constant width. The corresponding radiation patterns are shown in FIGS. 14, 15, and 16: these are respectively receive, transmit, and transmit-receive diagrams. With 128 omnidirectional sources spaced apart at 0.57λ, an overall illumination efficiency of −4.83 dB is obtained.

This method limits the number of control signals to be transmitted to the active modules to the number needed reconfiguring the phase shifters only: this is required in any case for depointing the beam, which is generally related to beam widening. Since the widening phase is identical in transmission and in reception, the control rate as applied to the phase shifters is moderate.

The attenuators situated on the receive paths of the active modules (or the variable gain LNAs) do not need to be controlled. They are preadjusted to a desired value and there is thus no risk of disturbing phase.

If it is desired to obtain widened radiation patterns that are better formed, an additional degree of freedom may be used which consists in controlling the gain of the TR modules on reception and as a function of time. This makes it possible to adapt the receive illumination law better in amplitude and in phase to each intended lobe width.

Thus, FIGS. 17 to 19 and 20 to 22 which are successive sets of transit, receive, and transmit-receive radiation patterns, show two lobes of very different widths (1.4° and 8.8° at 3 dB from the maximum) as generated by the same active array of 48 sources spaced apart by 0.822λ.

Transmit illumination continues to be equal amplitude so that the HPAs all operate at identical level.

Figure 22:
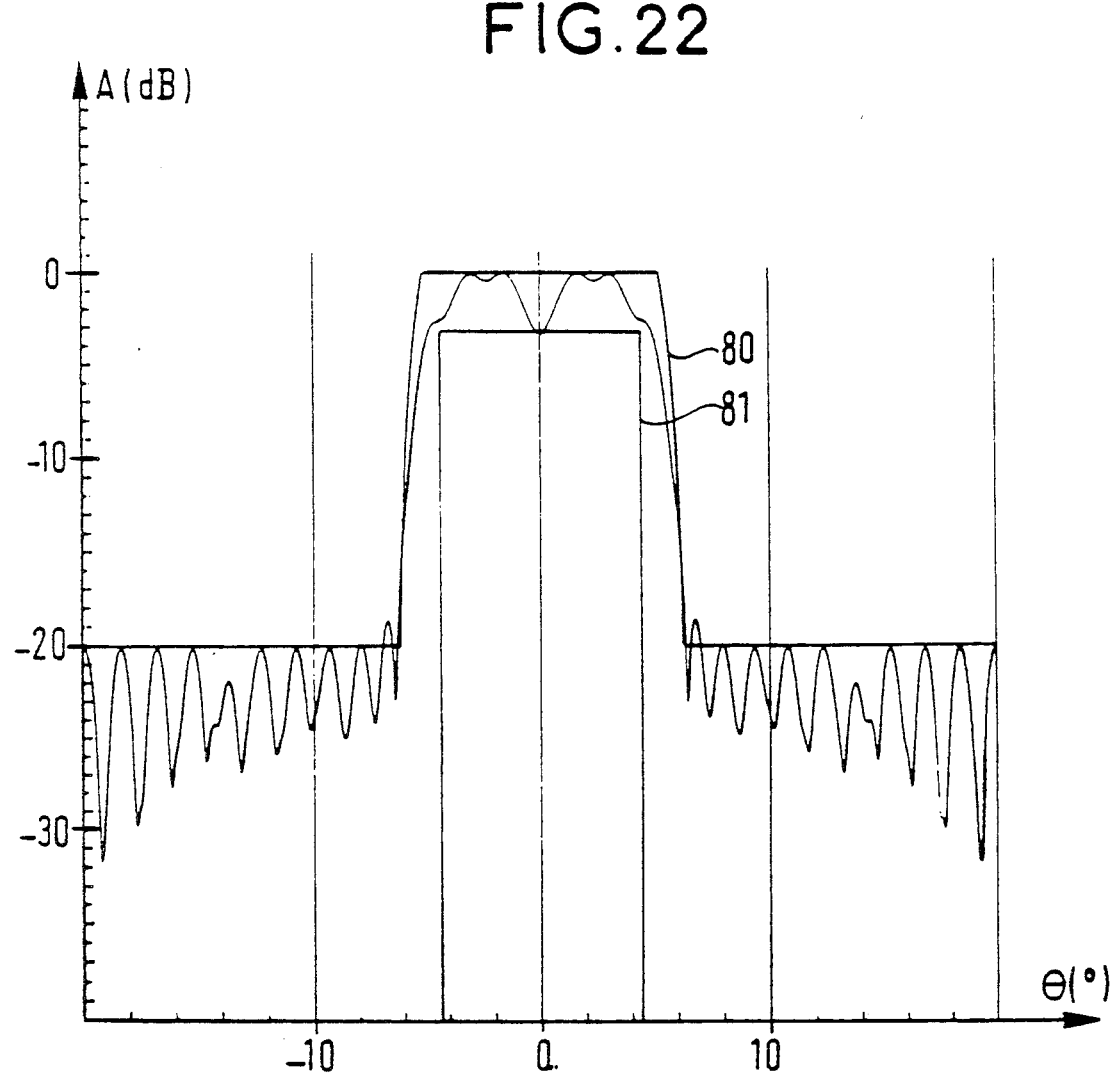

However, by changing the receive illumination law both in amplitude and in phase, it is possible to generate either a very fine lobe having an SLL≈−20 dB (FIG. 19) or else a wide lobe having very steep sides and a similar SLL (FIG. 22).

By using this additional degree of freedom in control (amplitude on reception), the wide lobe pattern has much steeper sides than the pattern of FIG. 16, thereby improving the discriminating power of the radar.

The only drawback of this variant is that the gain of the receive portions of the TR modules must be varied over time. This increases the control rate and means that additional drivers must be provided in the TR modules.

Two options are available for gain control:

either a maximum dynamic range is accepted (6.5 dB in the present example), thereby avoiding any need to change insertion phase in the receive path of a TR module;

or else, if a larger dynamic range is necessary to obtain a better pattern, then the resulting phase changes are determined and account is taken of them when controlling the phase shifters. This has the drawback of requiring them to be reconfigured very quickly between transmission and reception.

Some radars need to scan electronically in one plane only, e.g. in the elevation plane for side-looking airborne radar or for synthetic aperture radar.

In the horizontal plane of the antenna there is no need for numerous amplitude and phase control operations. To simplify the antenna, a small number of active modules are distributed over its length.

In this case, there are not enough amplitude and phase controls to be able to apply the above method to synthesizing the azimuth radiation pattern. However, the larger spacing of the TR modules makes it possible to apply a different principle:

this time an identical azimuth pattern is provided both in transmission and in reception;

the TR modules are distributed in non-uniform manner over the length of the antenna to provide the required amplitude weighting with all of the HPAs operating at the same output power, so as to optimize their efficiency as in the basic version.

An example of the above principle is described below.

Figure 23:
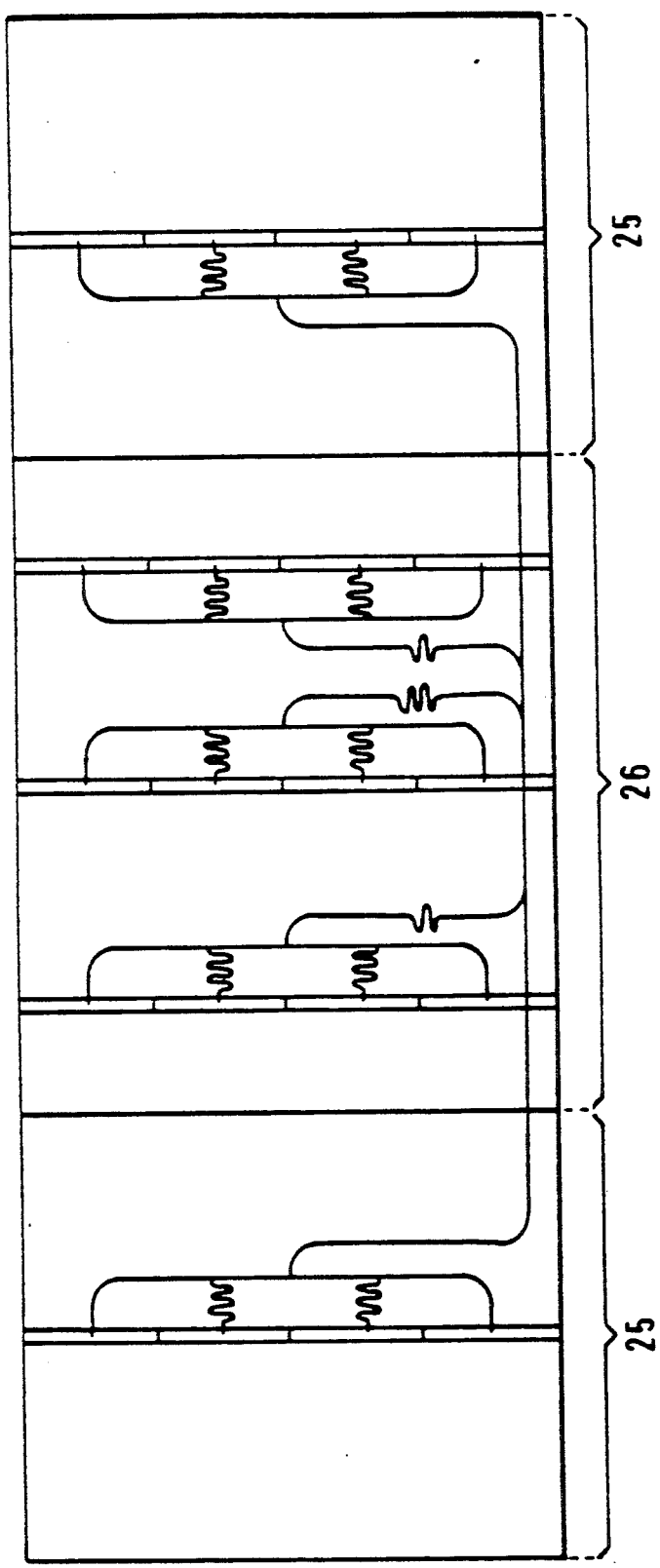
FIGS. 23 and 24 show one example of a slotted waveguide antenna using the principle of the invention in one plane only.
Figure 24:
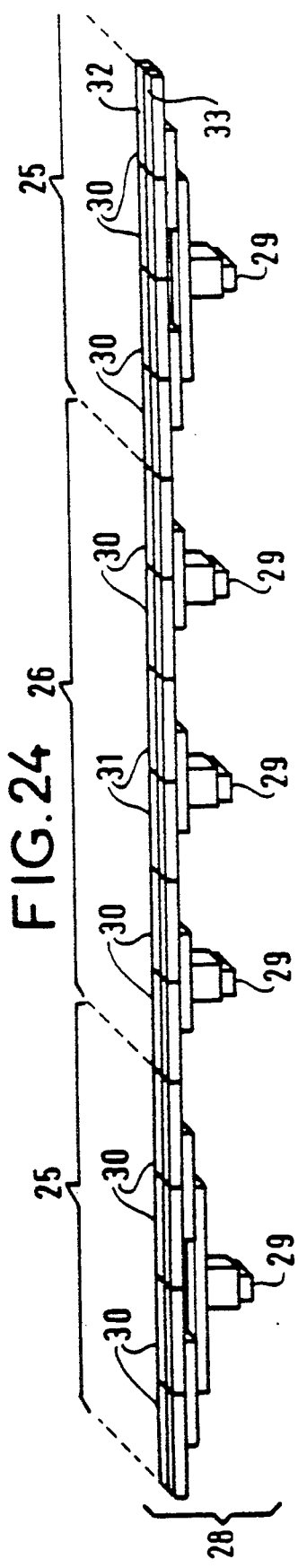

FIG. 23 shows a large active antenna (8.32 meters by 1.91 meters) for use as a space observation radar operating in SAR mode. In order to enable it to be folded beneath the nose cone of the launcher, the antenna is split up into three panels 25, 26, and 27. It includes 88 identical horizontal transmission lines 28, as shown in FIG. 24.

Figure 25A:
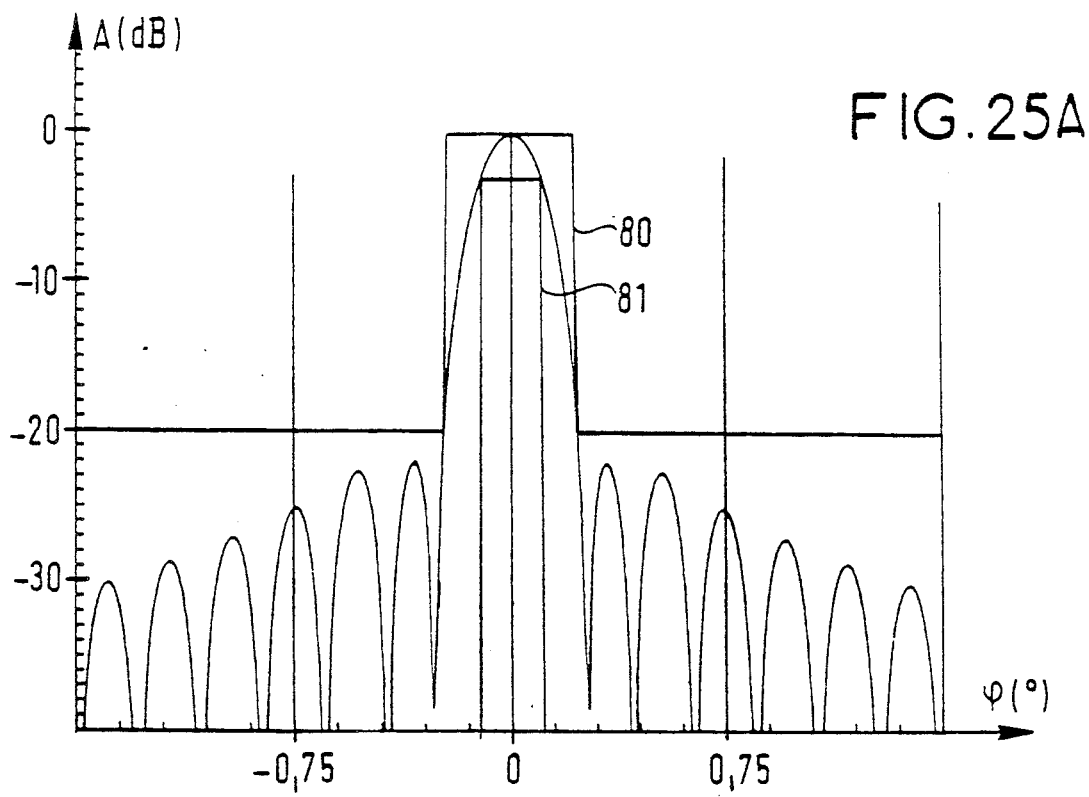
FIGS. 25a to 28 are transmit and/or receive radiation patterns (in parts A) and source excitation curves (in parts B).
Figure 25B:
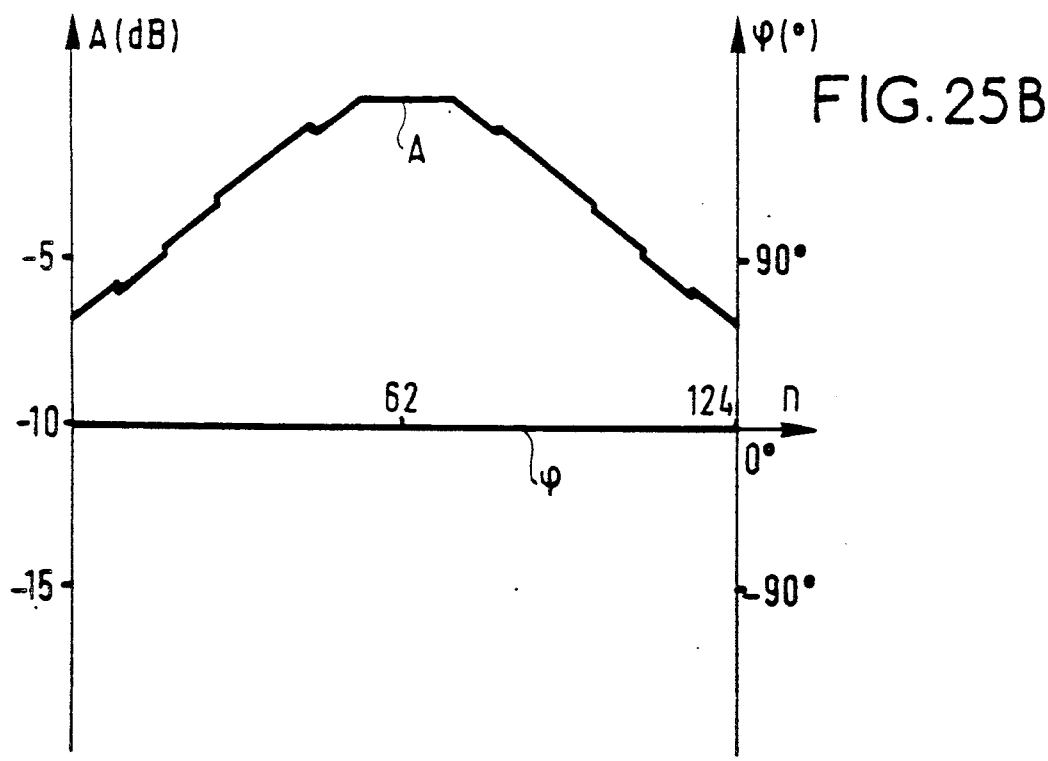

Five TR modules 29 are disposed on each horizontal line 28 of the radiating elements (in this case superposed slotted waveguides 32 and 33 radiating respectively in horizontal polarization and in vertical polarization). They are nonuniformly distributed (closer together in the center) and this distribution is associated with the conductances of the radiating slots being adjusted to obtain an amplitude law which varies linearly in dB from one end to the other, thereby enabling a good quality pattern to be obtained (FIG. 25).

Simultaneously, only two types of radiating waveguide are required:

waveguides 30 of length 60.4 cm having an angled illumination law; and waveguides 31 of length 53.7 cm having a uniform illumination law.

This greatly simplifies industrial manufacture of the antenna. However, for the elevation pattern, the method described above is applied.

Figure 26A:
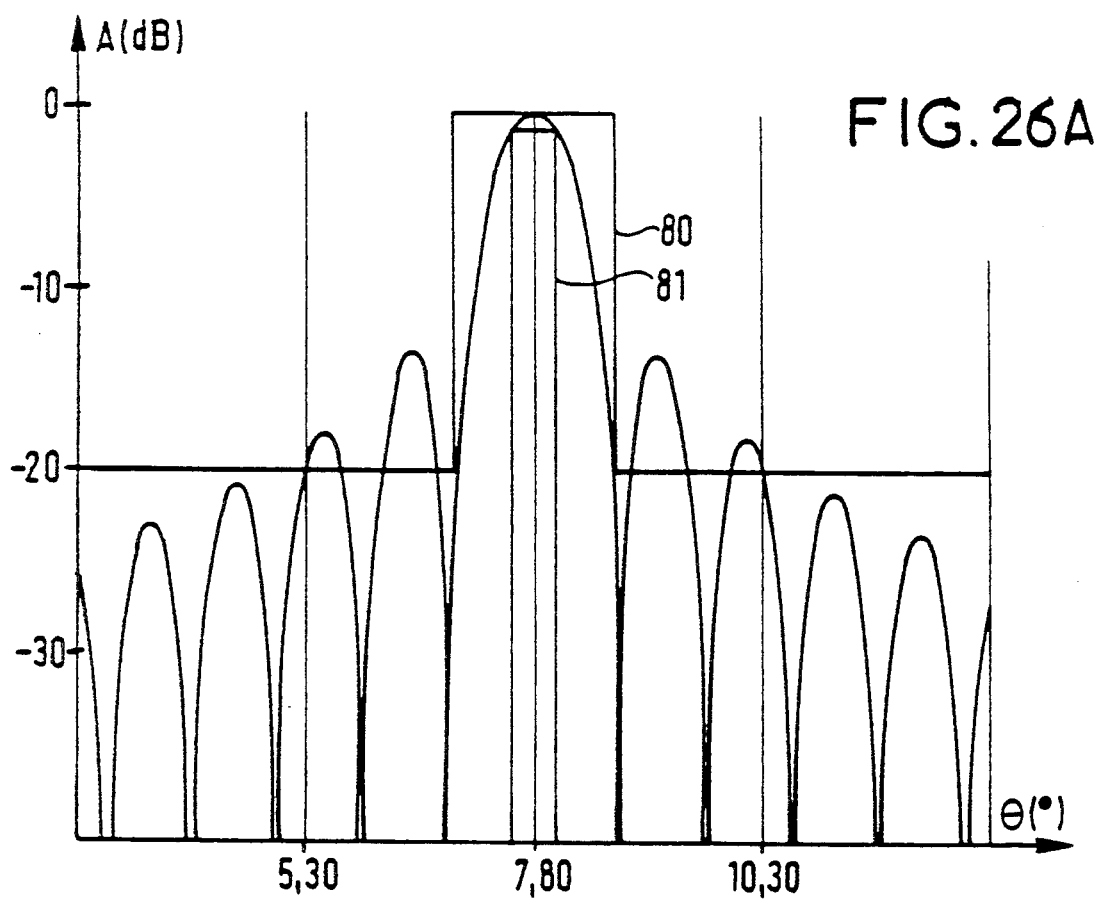
Figure 26B:
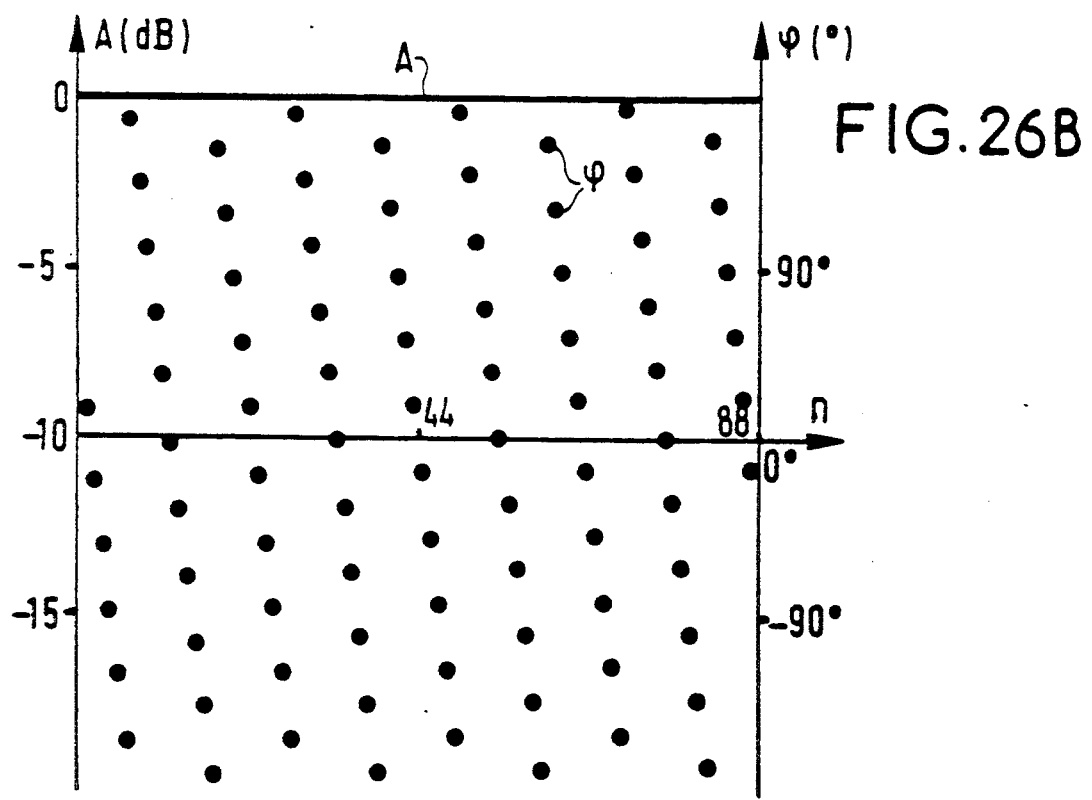
Figure 27A:
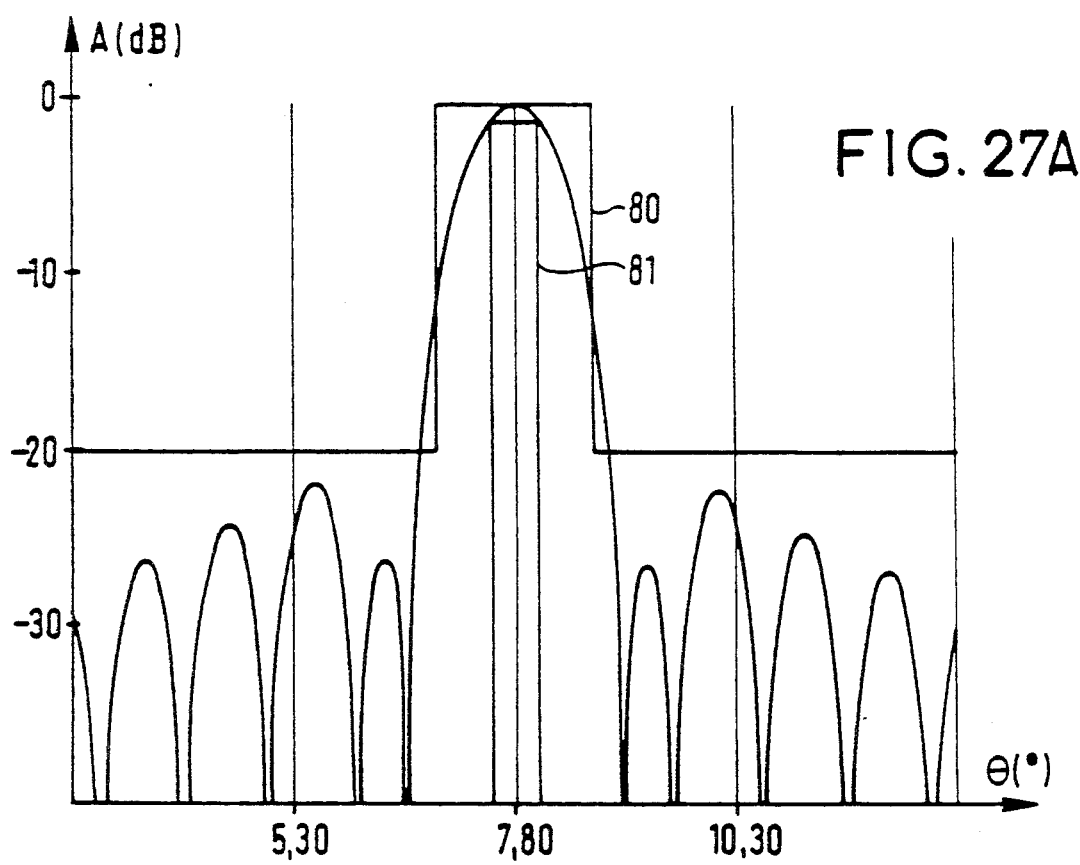
Figure 27B:
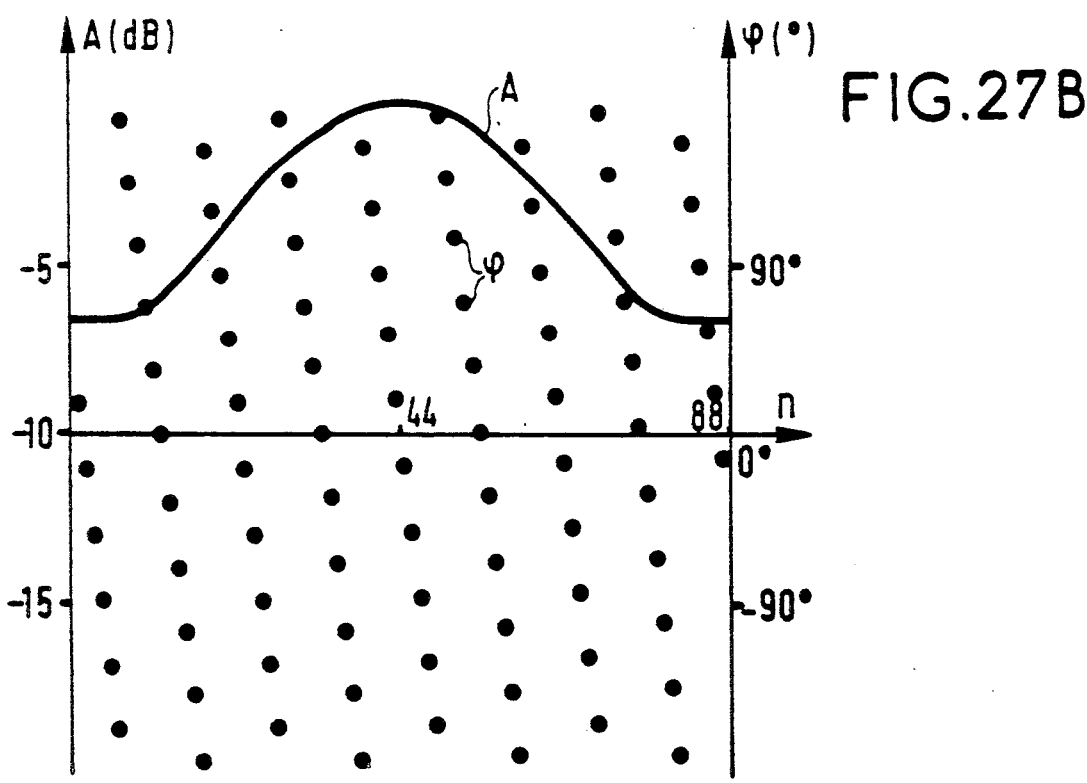
Figure 28:
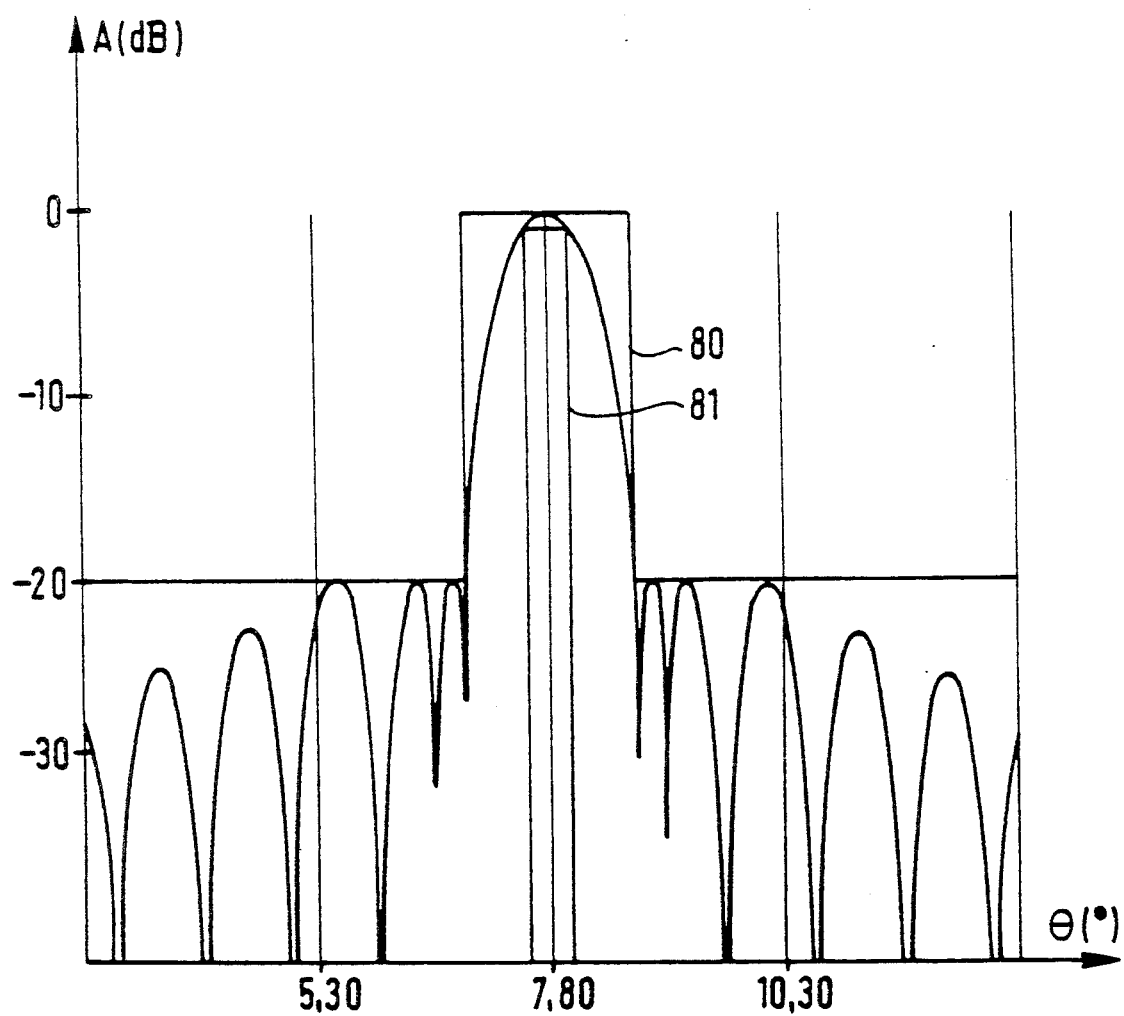

Since electronic scanning is important in this plane, each subpanel is phased controlled (where a subpanel comprises a set of two waveguides 32 and 33 which radiate with H and V polarization), i.e. phase control is provided at a pitch close to 0.7 times the wavelength;

there are therefore 88 active modules spread uniformly over the height of the antenna, with the height of the radiating waveguide always being the same;

on transmission, all of the HPAs have the same output power, thereby providing uniform illumination as shown in FIG. 26;

on reception, attenuators situated behind the LNAs are adjusted to provide weighting, thereby providing the pattern shown in FIG. 26; and the equivalent transmit-receive diagram as shown in FIG. 28 has the same qualities as described above.

Naturally, the present invention has been described and shown merely by way of preferred example and its component parts could be replaced by equivalents without thereby going beyond the scope of the invention.

What is claimed is:

1. A method of forming the radiation pattern of a high efficiency active antenna for electronically-scanned radar, said antenna having modules each associated with a radiating element of said antenna and including transmit and receive amplifiers operated in accordance with respective transmit and receive coefficients having phase and amplitude components and collectively defining a transmit pattern function Ge corresponding to a transmit pattern and a receive pattern function Gr corresponding to a receive pattern, said method comprising the steps of:

exciting each of said amplifiers with transmit coefficients of equal amplitude to maximize the efficiency of the transmit amplifiers which are all identical, thereby minimizing DC energy consumption and dissipation of the transmit amplifiers, and selecting said receive coefficients in accordance with said transmit coefficients such that said transmit and receive patterns are different but complementary and so as to obtain a desired product Ge·Gr of said transmit and receive pattern functions.

2. A method according to claim 1, wherein said antenna follows a phase law, and wherein the phase law is identical in transmission and in reception.

3. A method according to claim 1, wherein variable width radiation patterns are synthesized by applying an appropriate phase law without changing the power of the transmit amplifiers or the gain of receive paths.

4. A method according to claim 1, wherein the gain of a receive path is controlled so as to form patterns that are widened with steep sides, thereby improving the discriminating power of the radar.

5. A high efficiency active antenna for an electronically-scanned radar, the antenna having radiating elements and amplifiers immediately behind said radiating elements, the antenna comprising active transmit-receive modules including high power amplifiers situated after phase shifters in transmission, and low noise amplifiers situated before phase shifters on reception, wherein, in transmission, all of the high power amplifiers are identical and are uniformly distributed over the antenna, with all of the high power amplifiers delivering the same power which remains constant over time, and wherein various transmit-receive patterns of the antenna being optimized by controlling the active transmit-receive modules using the phase shifters in both transmission and reception and using gain control only in reception.

6. An antenna according to claim 5, wherein the high power and low noise amplifiers are operated in accordance with respective transmit and receive coefficients having phase and amplitude components and collectively defining a transmit pattern function Ge corresponding to a transmit radiation pattern and a receive pattern function Gr corresponding to a receive radiation pattern, and wherein in reception the gain of the low noise amplifiers is controlled such that the reception radiation pattern is adapted to the transmit radiation pattern.

7. An antenna according to claim 5, wherein all of the active transmit-receive modules are identical.

8. An antenna according to claim 5, wherein beam width of the transmit-receive patterns are varied solely by controlling the phase shifters in the same manner both in transmission and in reception while retaining equal amplitude excitations in transmission, but tapering amplitude excitations in reception.

9. An antenna according to claim 5, wherein the active-transmit receive modules are distributed in a non-uniform manner in one of the dimensions of the antenna to provide a constant beam shape with low side lobes, and on the other dimension, beam forming is obtained with uniform spacing of the transmit-receive modules, uniform power in transmission, control of phases in transmission and reception, and eventually control of gain in reception.

* * * * *